United States Patent
Tenny et al.

(10) Patent No.: US 9,036,502 B2
(45) Date of Patent: *May 19, 2015

(54) METHOD AND APPARATUS FOR MANAGING INTERACTION BETWEEN DRX CYCLES AND PAGING CYCLES

(71) Applicant: QUALCOMM Incorporated, San Diego, CA (US)

(72) Inventors: Nathan Edward Tenny, Poway, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,012

(22) Filed: Aug. 11, 2014

(65) Prior Publication Data

US 2014/0348020 A1  Nov. 27, 2014

Related U.S. Application Data

(63) Continuation of application No. 12/479,590, filed on Jun. 5, 2009, now Pat. No. 8,804,546.

(60) Provisional application No. 61/061,515, filed on Jun. 13, 2008.

(51) Int. Cl.
*H04J 1/16* (2006.01)
*H04W 76/04* (2009.01)
(Continued)

(52) U.S. Cl.
CPC ............ *H04W 76/048* (2013.01); *H04W 68/00* (2013.01); *H04W 76/04* (2013.01); *H04W 24/08* (2013.01)

(58) Field of Classification Search
CPC . H04W 48/20; H04W 52/0216; H04W 68/00; H04W 76/04; H04W 4/005; H04W 52/0287
See application file for complete search history.

(56) References Cited

U.S. PATENT DOCUMENTS 5,910,944 A  6/1999  Callicotte et al.
(Continued)

FOREIGN PATENT DOCUMENTS

CN  101002493 A  7/2007
EP  0536099 B1  10/1996
(Continued)

OTHER PUBLICATIONS

3GPP: "3GPP TS 36.331 V8.2.0 (May 2008); 3rd Generation Partnership Project; Technical Specification Group Radio Access Network ^ Evolved Universal Terrestrial Radio Access (E-UTRA); Radio Resource Control (RRC); Protocol specification (Release 8)" 3GPP, [Online] Jun. 9, 2008, p. 1,2,12-29,67,68,94,95,100-103, XP002550516 Retrieved from the Internet: URL:http://www.3gpp.org/ftp/Specs/html -i nf 0/36331.htm> [retrieved on Oct. 14, 2009] paragraphs [4.2.1], [04.4], [5.2.1.1] - [5.2.1.3], [5.3.2] pp. 67,94,95.
(Continued)

Primary Examiner — Ayaz Sheikh
Assistant Examiner — Mounir Moutaouakil
(74) Attorney, Agent, or Firm — Anthony R. Morris

(57) ABSTRACT

Systems and methodologies are described that facilitate managing interaction between paging and discontinuous reception (DRX) cycles for users operating in a communication system. As described herein, a connected mode user having an associated DRX cycle can modify its schedule for paging reception to minimize unnecessary periods of activity. For example, a user can initially schedule monitoring of paging occasions that coincide with periods of activity associated with the DRX cycle of the user. If such paging occasions are not sufficient to reach a minimum required number of monitored paging occasions, additional paging occasions can be monitored as needed by scheduling additional periods of activity and/or extending periods of activity specified in the DRX cycle. Additionally or alternatively, a network can synchronize a connected mode DRX cycle associated with a user with an idle mode paging cycle for the user, thereby providing power and performance benefits with low complexity.

26 Claims, 17 Drawing Sheets

(51) Int. Cl.
*H04W 68/00* (2009.01)
*H04W 24/08* (2009.01)

(56) References Cited

U.S. PATENT DOCUMENTS

| | | | |
|---|---|---|---|
| 7,079,840 B2 | 7/2006 | Roberts et al. | |
| 7,110,765 B2 | 9/2006 | Amerga et al. | |
| 7,450,933 B2 * | 11/2008 | Kwak et al. | 455/414.1 |
| 7,535,882 B2 * | 5/2009 | Kim | 370/338 |
| 7,602,802 B2 * | 10/2009 | Kim | 370/432 |
| 8,050,208 B2 * | 11/2011 | Jung et al. | 370/311 |
| 8,135,405 B2 | 3/2012 | Mittal et al. | |
| 8,144,735 B2 | 3/2012 | Vayanos et al. | |
| 8,155,596 B2 | 4/2012 | Eckert et al. | |
| 8,169,957 B2 * | 5/2012 | Damnjanovic | 370/329 |
| 8,180,335 B2 * | 5/2012 | Kitazoe et al. | 455/418 |
| 8,185,726 B2 | 5/2012 | Taha et al. | |
| 8,200,253 B2 * | 6/2012 | Du | 455/458 |
| 8,311,563 B2 * | 11/2012 | Lee et al. | 455/503 |
| 8,553,726 B2 * | 10/2013 | Lee et al. | 370/480 |
| 8,638,715 B2 * | 1/2014 | Nader | 370/328 |
| 8,804,546 B2 | 8/2014 | Tenny et al. | |
| 2005/0195852 A1 | 9/2005 | Vayanos et al. | |
| 2007/0133456 A1 | 6/2007 | Ding | |
| 2009/0316603 A1 | 12/2009 | Amerga et al. | |

FOREIGN PATENT DOCUMENTS

| | | |
|---|---|---|
| EP | 1530395 A2 | 5/2005 |
| EP | 1553798 A1 | 7/2005 |
| EP | 1565026 A2 | 8/2005 |
| KR | 100823903 B1 | 4/2008 |
| RU | 2120181 C1 | 10/1998 |
| RU | 2201655 C2 | 3/2003 |
| TW | 200818954 A | 4/2008 |
| WO | 2004021731 A2 | 3/2004 |
| WO | 2005079105 A1 | 8/2005 |
| WO | 2008027946 A2 | 3/2008 |

OTHER PUBLICATIONS

International Search Report & Written Opinion—PCT/US2009/047092, International Search Authority—European Patent Office—Oct. 27, 2009.

Taiwan Search Report—TW098119784—TIPO—Jul. 25, 2012.

Vinella, et al., "Discontinuous Reception and Transmission (DRX/DTX) Strategies in Long Term Evolution (LTE) for Voice-Over-IP (VOIP) Traffic Under Both Full-Dynamic and Semi-Persistent Packet Scheduling Policies," Nov. 20, 2009, pp. 1-123.

* cited by examiner

METHOD AND APPARATUS FOR MANAGING INTERACTION BETWEEN DRX CYCLES AND PAGING CYCLES

CROSS-REFERENCE

This application is a continuation of U.S. application Ser. No. 12/479,590, filed Jun. 5, 2009, which claims the benefit of U.S. Provisional Application Ser. No. 61/061,515, filed Jun. 13, 2008, and entitled "A METHOD AND APPARATUS FOR MANAGING INTERACTION BETWEEN DRX CYCLES AND PAGING CYCLES," the entirety of which is incorporated herein by reference.

BACKGROUND

I. Field

The present disclosure relates generally to wireless communications, and more specifically to techniques for receiver scheduling and management in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

In various wireless communication implementations, a network can communicate information to respective users via transmission of paging messages. Traditionally, paging is conducted at corresponding intervals in time defined by paging cycles such that respective users are configured to receive paging messages in association with at least one assigned paging cycle. For example, a user in idle mode can be assigned a paging cycle on which the user is to monitor a paging channel such that a network accessed by the user can transmit in paging occasions on the paging cycle that are targeted to the user(s) on the paging cycle. Subsequently, upon leaving idle mode and entering a connected mode, the user can receive scheduled transmissions, which may include transmissions scheduled according to a connected-mode Discontinuous Reception (DRX) cycle associated with the user.

In addition to providing information to idle users, a network can utilize paging to indicate a change of system information. This is conventionally achieved by transmitting paging messages indicating the change on all paging cycles in order to reach all users that monitor the network. Accordingly, in the event of a system information modification, both idle users and connected users can be required to monitor for a predefined number of paging messages indicating the modification. However, in the event that a DRX cycle associated with a connected mode user and respective paging cycles used by the network differ, sufficient paging messages may not be transmitted by the network at a time at which a connected mode user is actively receiving information. In such a scenario, a connected mode user may be required to monitor a paging channel at a significant number of intervals at which the user would otherwise be inactive due to the connected mode DRX cycle, which can consequentially result in a loss of efficiency, power performance, or the like. Accordingly, it would be desirable to implement techniques for paging management in connection with system information modification that mitigate at least the above shortcomings

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a minimum number of paging occasions configured for indicating a change of system information to be monitored during a modification period; identifying a discontinuous reception (DRX) cycle to be utilized during the modification period; and selecting respective paging occasions to monitor during the modification period such that the minimum number of paging occasions configured for indicating a change of system information is monitored and wakeup periods for monitoring paging occasions outside the DRX cycle are substantially minimized.

A second aspect relates to a wireless communications apparatus, which can comprise a memory that stores data relating to a threshold amount of system information modification indicators provided at respective paging occasions during a modification period and a connected mode DRX cycle comprising respective DRX occasions. The wireless communications apparatus can further comprise a processor configured to schedule attempted detection of the threshold amount of system information modification indicators in a modification period such that activity outside of the DRX occasions associated with the DRX cycle is substantially minimized.

A third aspect described herein relates to an apparatus operable in a wireless communication system. The apparatus can comprise means for identifying a minimum number of paging occasions configured for carrying respective change indications to be read in a modification period; means for configuring a DRX cycle that specifies respective periods of activity and inactivity associated with a connected mode of the apparatus; and means for selecting paging occasions to monitor in a modification period such that the minimum number of paging occasions configured for carrying respective change indications are readable and receiver activity outside respective periods of activity specified by the DRX cycle is substantially minimized.

A fourth aspect described herein relates to a computer program product, which can comprise a computer-readable medium that includes code for causing a computer to identify a threshold amount of system information modification indicators configured to be provided during respective paging occasions associated with at least a portion of a modification period; code for causing a computer to configure a connected mode DRX cycle comprising respective periods of activity and inactivity; and code for causing a computer to schedule monitoring of respective paging occasions configured to provide system information modification indicators in a modification period such that sufficient paging occasions are monitored to facilitate detection of at least the threshold amount of system information modification indicators and activity outside of the periods of activity specified by the DRX cycle is substantially minimized.

According to another aspect, a method operable in a wireless communication system is described herein. The method can comprise obtaining a number modificationPeriodCoeff corresponding to an amount of systeminfoModification notifications associated with a change of system information; detecting a boundary corresponding to a modification period; monitoring one or more paging messages within the modification period based at least in part on an associated DRX schedule; determining whether a systeminfoModification notification is present in the monitored paging messages at least modificationPeriodCoeff times; if the systeminfoModification notification is not present in the monitored paging messages at least modificationPeriodCoeff times, assuming that presently stored system information remains valid through the modification period; and if the systeminfoModification notification is present in the monitored paging messages at least modificationPeriodCoeff times, preparing for a change of system information to occur in a following modification period.

An additional aspect described herein relates to a method that can be utilized in a wireless communication environment. The method can comprise identifying a paging cycle associated with a terminal; determining length and offset parameters associated with the paging cycle; and generating a DRX cycle for the terminal such that periods of activity corresponding to the DRX cycle at least partially coincide with periods of activity corresponding to the paging cycle associated with the terminal based at least in part on the length and offset parameters associated with the paging cycle.

A seventh aspect relates to a wireless communications apparatus, which can comprise a memory that stores data relating to a user equipment unit (UE) and a paging cycle associated with the UE. The wireless communications apparatus can further comprise a processor configured to determine length and offset parameters associated with the paging cycle and to configure a DRX cycle for the UE based at least in part on the length and offset parameters associated with the paging cycle such that the DRX cycle comprises periods of activity that at least partially coincide with periods of activity within the paging cycle for the UE.

An eighth aspect described herein relates to an apparatus operable in a wireless communication system. The apparatus can comprise means for identifying a UE paging cycle having associated periods of activity; means for identifying parameters relating to a length and offset of the UE paging cycle; and means for configuring a DRX cycle having associated periods of activity such that the periods of activity associated with the DRX cycle and the periods of activity associated with the UE paging cycle at least partially coincide based at least in part on the identified parameters relating to the UE paging cycle.

A ninth aspect described herein relates to a computer program product, which can include a computer-readable medium that comprises code for causing a computer to identify a terminal and a paging cycle associated with the terminal, the paging cycle comprising respective paging occasions; code for causing a computer to determine a length and offset associated with the paging cycle; and code for causing a computer to configure a DRX cycle for the terminal comprising respective DRX occasions based at least in part on the length and offset associated with the paging cycle such that respective DRX occasions in the DRX cycle at least partially coincide with respective paging occasions in the paging cycle.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
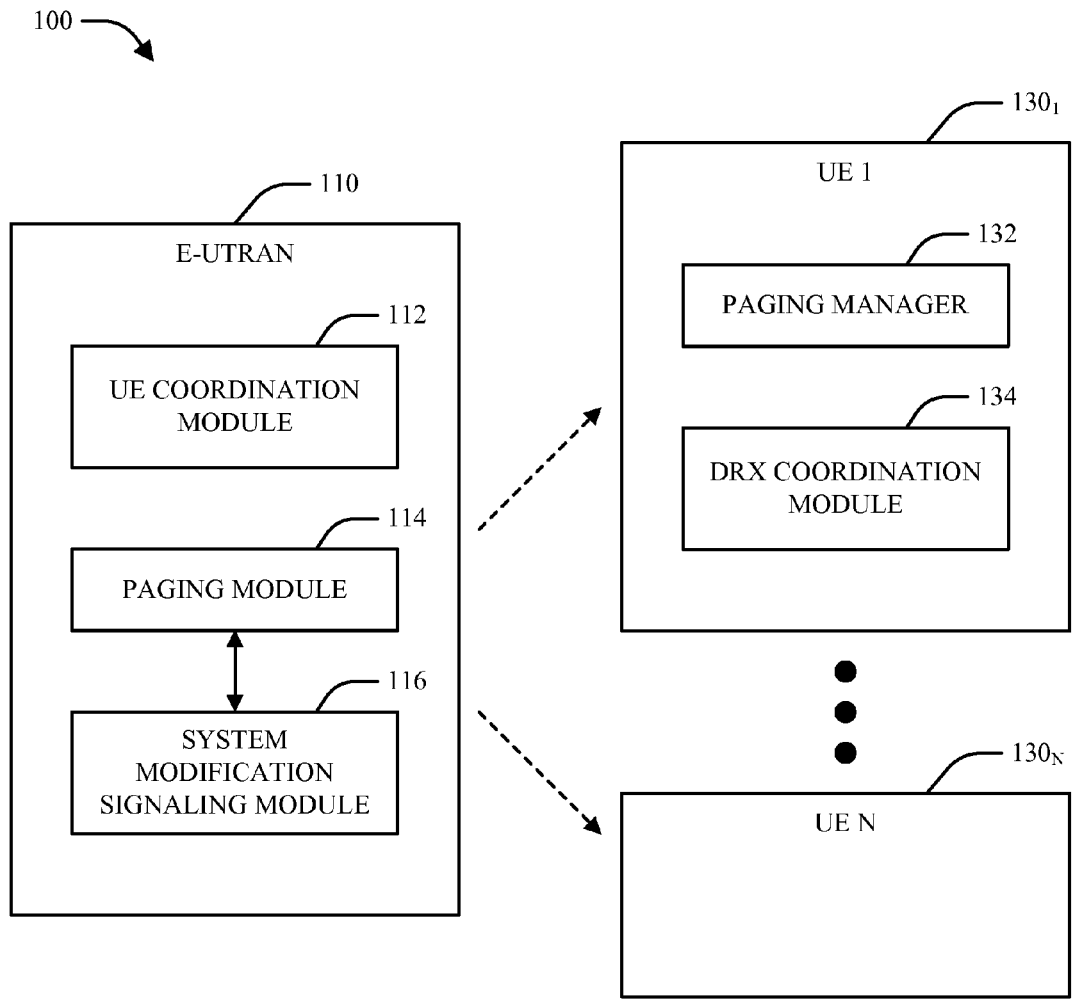
FIG. 1 is a block diagram of a system that facilitates management and coordination of Discontinuous Reception (DRX) and paging cycles associated with respective entities in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 that facilitates management and coordination of DRX and paging cycles associated with respective entities in a wireless communication system in accordance with various aspects described herein. As FIG. 1 illustrates, system 100 can include an Evolved UMTS (Universal Mobile Telecommunications System) Terrestrial Radio Access Network (E-UTRAN) 110, which can comprise one or more system controllers, base stations (e.g., access points (APs), Node Bs, Evolved Node Bs (eNBs), etc.), and/or other suitable entities for communication with one or more user equipment units (UEs, also referred to herein as access terminals (ATs), mobile terminals, etc.) 130. In one example, E-UTRAN 110 can engage in one or more downlink (DL, also referred to as forward link (FL)) communications with UEs 130 and/or 140, and UEs 130 can engage in one or more uplink (UL, also referred to as reverse link (RL)) communications with E-UTRAN 110. Further, it should be appreciated that while only one UE 130 is illustrated as including respective subcomponents 132-138 for simplicity of illustration, any suitable UE 130 in system 100 could include and/or otherwise be associated with any of subcomponents 132-138.

In accordance with one aspect, E-UTRAN 110 can manage communication within system 100 by, for example, coordinating resource usage among UEs 130, scheduling transmissions to and/or from respective UEs 130, assigning transmit power parameters and/or other suitable transmission parameters to UEs 130 and/or other entities in system 100, or the like. In one example, E-UTRAN 110 can include and/or otherwise be associated with a UE coordination module 112, which can be utilized to facilitate management and/or coordination of respective UEs 130. For example, E-UTRAN 110 can utilize UE coordination module 112 to store data relating to paging DRX cycles associated with respective UEs 130, to assign respective connected mode DRX cycles to UEs 130, and/or to perform any other suitable function(s) that facilitate management and coordination of UEs 130.

In accordance with another aspect, E-UTRAN 110 can additionally include and/or otherwise be associated with a paging module 114, which can be utilized by E-UTRAN 110 to communicate information to UEs 130 and/or other entities in system 100 in the form of respective pages or paging messages. In one example, paging messages can be designed as unicast, multicast, and/or broadcast messages and can be transmitted by paging module 114 over a paging channel and/or any other suitable channel to one or more designated UEs 130. In another example, a UE 130 in system 100 can be associated with a paging cycle as a function of various system configuration parameters, the identity of the UE 130, and/or other suitable information. Further, a paging cycle associated with a UE 130 can be independently determined by the UE 130 (e.g., using a paging manager 132), by E-UTRAN 110 on behalf of the UE 130 (e.g., using UE coordination module 112), and/or by any other suitable entity in system 100.

In one example, a paging cycle associated with a given UE 130 can be configured as a static parameter within system 100 such that the paging cycle for a given UE 130 is restricted from reconfiguration once set. This can be done, for example, to ensure that E-UTRAN 110 has continuous knowledge of respective UEs 130 in system 100 that are affected by setting a paging indicator in a given paging cycle. In another example, a paging cycle can be configured as a DRX cycle associated with a given UE 130, which can be utilized by the UE 130 for detecting paging signals from E-UTRAN 110 while in an idle mode. Thus, based on a paging cycle configured for a given UE 130 in idle mode, paging module 114 at E-UTRAN 110 can conduct paging transmissions for the UE 130 at predetermined intervals in time in accordance with the paging cycle, and paging manager 132 and/or another suitable module at UE 130 can be configured to monitor for paging transmissions from E-UTRAN 110 at the intervals specified by the paging cycle. By way of specific, non-limiting example, paging transmissions can be conducted over a Physical Downlink Control Channel (PDCCH) and/or any other suitable channel associated with system 100. Further, paging module 114 at E-UTRAN 110 can indicate a paging transmission by setting a reserved Paging Radio Network Temporary Identifier (P-RNTI) and/or another suitable paging indicator on specified PDCCH resources, based on which a paging manager 132 at UE 130 can monitor the specified PDCCH resources for the paging indicator on an associated paging DRX cycle.

In accordance with an alternative aspect, UE 130 can operate in a connected mode (e.g., as indicated by an RRC_CONNECTED state), wherein UE 130 can receive scheduled data from E-UTRAN 110 according to a connected mode DRX cycle associated with UE 130. In one example, a DRX cycle associated with UE 130 while in connected mode can be derived, managed, and/or otherwise processed by a DRX coordination module 134 at UE 130 and/or any other suitable entity in system 100. By way of non-limiting example, a UE 130 in connected mode can be assigned a DRX cycle, on which UE 130 can be configured to decode the PDCCH on various DRX occasions defined by the assigned DRX cycle and to perform corresponding transmission and/or reception. Thus, it can be appreciated that DRX occasions monitored by UE 130 in connected mode are disparate from paging occasions as described herein, which correspond to instants in time at which UE 130 can be configured to monitor PDCCH for paging reception in idle mode. By way of further specific, non-limiting example, communication performed by a UE 130 in a connected mode can correspond to a Voice over Internet Protocol (VoIP) call and/or another suitable application that utilizes bursts of data at regular intervals.

In accordance with another aspect, E-UTRAN 110 can additionally or alternatively utilize paging to provide indications of a change of system information associated with E-UTRAN 110 to respective UEs 130 that access E-UTRAN 110. In one example, system information change indication can be generated and/or otherwise obtained by a system modification signaling module 116, which can act independently and/or in cooperation with paging module 114 to transmit the indication within one or more paging occasions to respective UEs 130.

Figure 2:
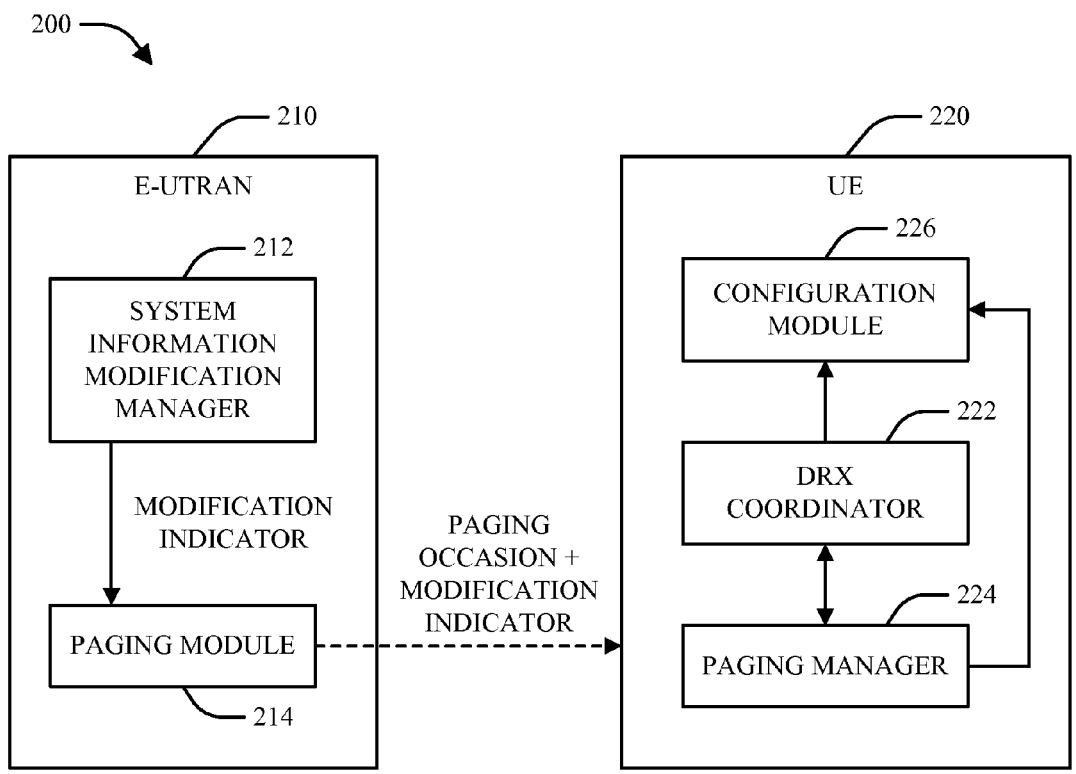
FIG. 2 is a block diagram of a system that facilitates system information modification within a wireless communication environment in accordance with various aspects.

Example techniques that can be utilized within a wireless communication environment to transmit and process paging messages associated with a change of system information are illustrated by system 200 in FIG. 2. In accordance with one aspect, an E-UTRAN 210 desiring to modify associated system information can utilize a system information modification manager 212 and/or any other suitable component(s) associated with E-UTRAN 210 to generate respective system modification indicators. The indicators can, in turn, be provided to a paging module 214, which can leverage the paging functionality of E-UTRAN 210 to transmit the indicator within a paging occasion to one or more UEs 220. In one example, a paging occasion indicating a change of system information can be detected by a paging manager 224 and/or another suitable component of UE 220, which can subsequently utilize a configuration module 226 or the like to adjust operation of UE 220 to reflect the system information change.

In the event that one or more parameters associated with E-UTRAN 210 are modified, it can be appreciated that substantially all UEs 220 that access E-UTRAN 210 can be affected by the modification. Thus, in one example, E-UTRAN 210 can be configured to provide an indicator of the modification on all or substantially all paging cycles associated with system 200 in order to ensure that all UEs 220 served by E-UTRAN 210 are informed of the modification.

Figure 3:
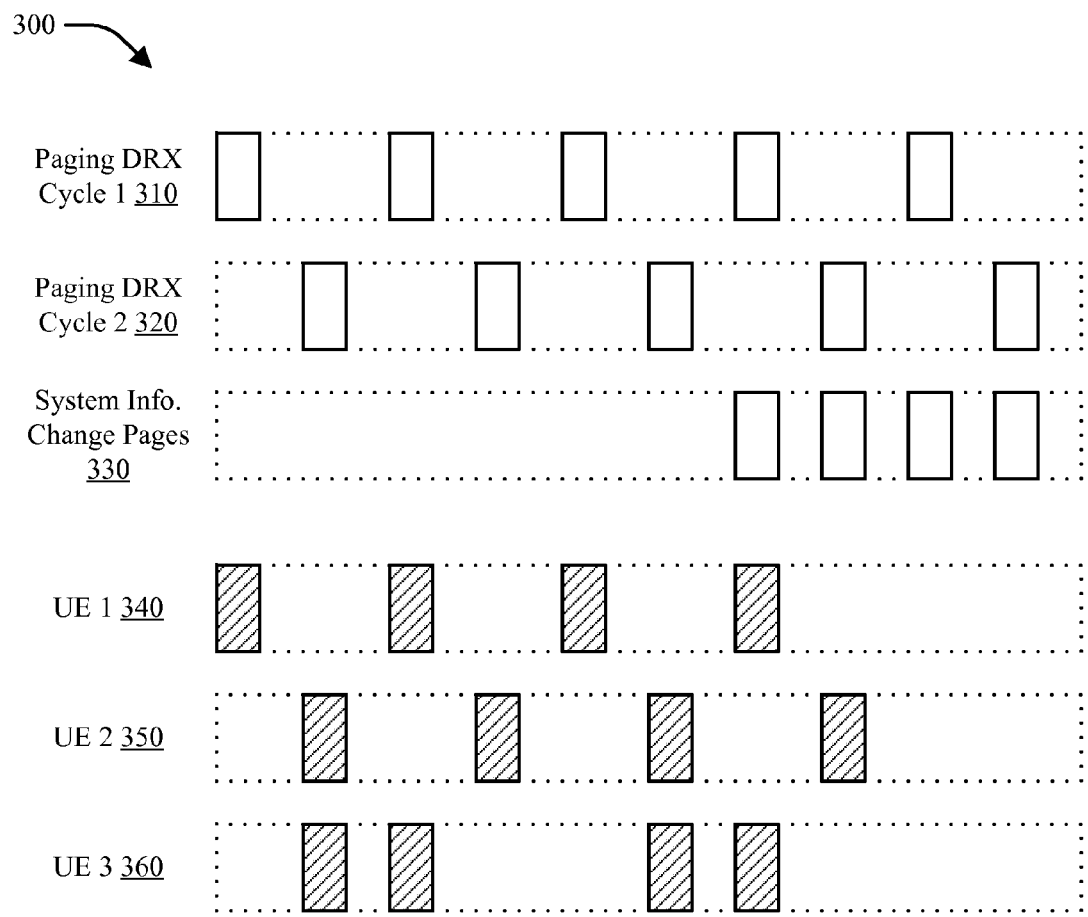
FIG. 3 illustrates respective timing scenarios for system information change detection in accordance with various aspects.

In accordance with one aspect, an example of paging that can be performed in connection with a system information change is illustrated by diagram 300 in FIG. 3. As diagram 300 illustrates, a network can be associated with respective paging cycles 310-320 that specify time intervals on which paging messages are transmitted to respectively corresponding UEs. As diagram 300 further illustrates, at the time a change in system information is to be indicated, paging messages 330 corresponding to all paging cycles 310-320 can be configured to include a system information change indicator. By indicating a system information change on all paging cycles, it can be appreciated that information relating to the change can be detected by all UEs associated with the network regardless of paging cycle. Thus, for example, a first UE 340 associated with paging cycle 310 and a second UE 350 associated with paging cycle 320 can detect the system information modification based on paging messages transmitted on the paging cycles 310-320 respectively associated with the UEs 340-350, and a third UE 360 associated with an irregular paging cycle can detect the system information modification on a paging occasion associated with either paging cycle 310-320 during a notification period associated with the system information change.

Returning to FIG. 2, it can be appreciated that a UE 220 operating in an idle mode can operate as shown in diagram 300 to detect paging occasions at regular intervals associated with a paging DRX cycle for the UE 220. Alternatively, UE 220 can operate in a connected mode, wherein a DRX coordinator 222 and/or another suitable entity associated with UE 220 can conduct scheduled communication of data, control signaling, and/or other suitable information in accordance with a connected mode DRX cycle associated with UE 220. In one example, in addition to conducting scheduled communication pursuant to a UE DRX cycle, a UE 220 in connected mode can be configured to act independently and/or in cooperation with paging manager 224 to monitor for paging occasions associated with a system information modification.

Figure 4:
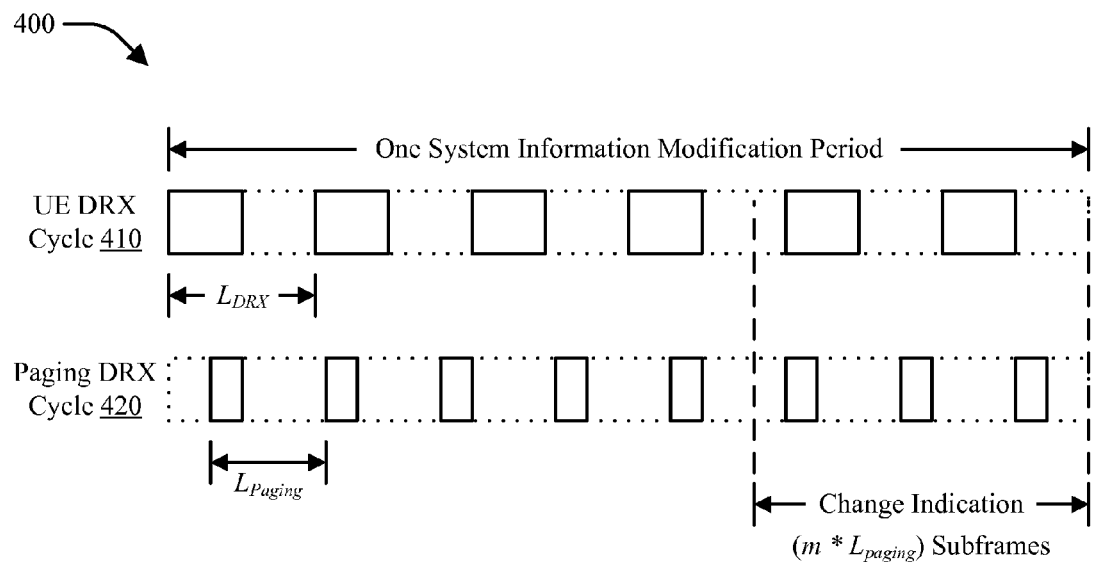
FIG. 4 illustrates example interactions between DRX cycles and paging cycles associated with a wireless device in accordance with various aspects.

In view of the above, a UE DRX cycle 410 associated with a given UE operating in a connected mode and respective paging cycles 420 utilized within an associated network can interact as illustrated by diagram 400 in FIG. 4. As diagram 400 illustrates, a UE in connected mode can be configured with a DRX cycle 410 having a length of $L_{DRX}$ subframes for communication with an associated network. In one example, a UE in connected mode can be configured with knowledge of its associated DRX cycle 410 such that, on periods of activity in the DRX cycle 410 (illustrated as solid regions in diagram 400), the UE can activate, listen for scheduled transmissions from an associated network, and subsequently return to an inactive or power saving state in which the UE does not actively communicate.

As further illustrated by diagram 400, an associated network can provide paging occasions on one or more paging cycles 420 having a length of $L_{Paging}$ subframes. In the event that system parameters are to be modified, the network can additionally configure respective paging occasions to include indications (e.g., systeminfoModification) that network-wide parameters are to be modified at the next modification period boundary. In one example, such indications can be provided on a predetermined number m of paging cycles in a system information modification period during which the modification can occur, after which the network can transmit the relevant updated system parameters.

In another example, in order to ensure reliable reception of the indications, respective UEs associated with the network can be configured to receive at least a predetermined number k (e.g., modificationPeriodCoeff) of paging cycles during the m paging cycles on which change indications are provided, where k≤m. While system 400 illustrates that change indications are provided at the end of a system modification period, it should be appreciated that change indications can be provided at any suitable portion(s) of a system information modification period and/or throughout one or more system modification periods.

In one example, if a DRX cycle 410 associated with a UE causes the UE to be active for connected mode communication at a given set of subframes, the UE can additionally detect respective pages sent in accordance with one or more paging cycles 420 over the set of subframes. Thus, as illustrated in diagram 400, a UE operating according to DRX cycle 410 can identify pages sent by the network on paging cycle 420 during, for example, the first, second, fourth, and fifth DRX occasions specified by DRX cycle 410.

However, as a connected mode DRX cycle 410 associated with a given UE is generally not determined in relation to an idle mode paging cycle 420 associated with the UE, a UE DRX cycle 410 and paging DRX cycle 420 can in some cases be structures such that DRX occasions and paging occasions do not coincide. Thus, by way of example as illustrated in diagram 400, if a UE associated with DRX cycle 410 has a requirement to read k>1 paging occasions in the m=3 paging cycles before the end of the system modification period wherein change indications are provided, the UE can in some cases be required to activate outside of DRX cycle 410 in order to obtain at least one additional paging occasion. For example, under conventional paging approaches, a UE in such a scenario can be required to remain active on its associated connected mode DRX cycle 410 as well as its idle mode paging cycle in the event of system information modification. However, as activity outside of DRX cycle 410 occurs in time periods at which the UE would otherwise be in a power saving mode, such approaches can result can result in a loss of power efficiency due to excessive reception of paging occasions.

Figure 5:
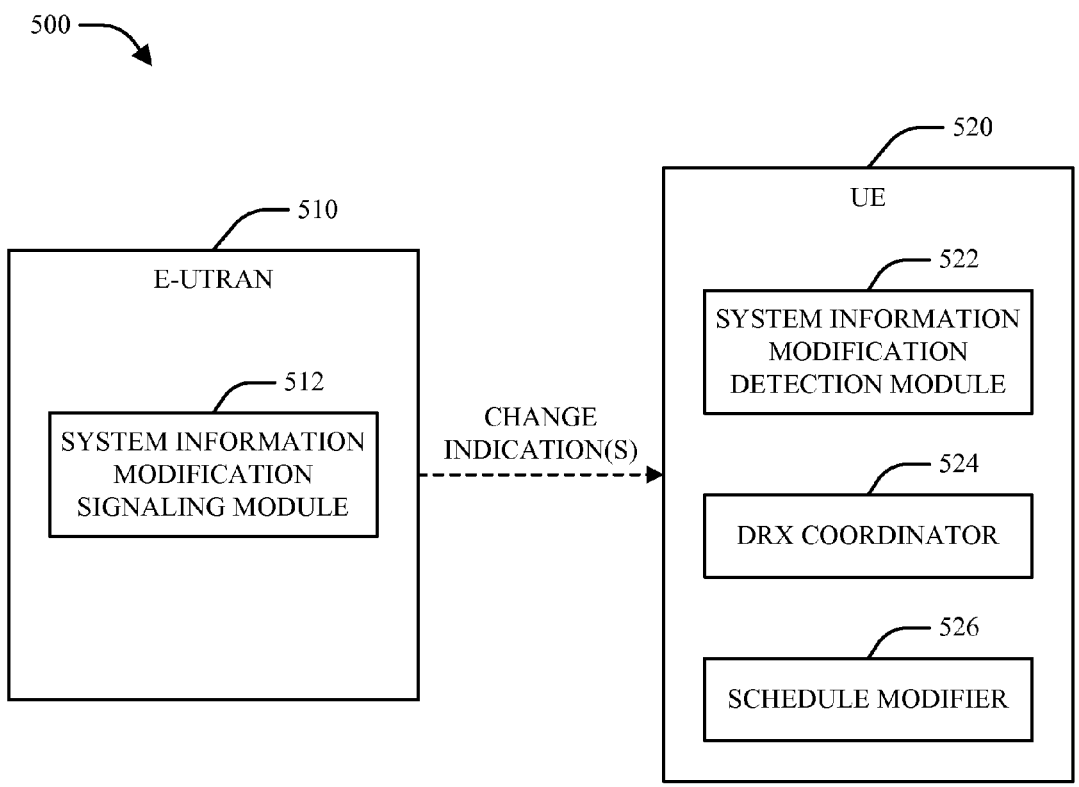
FIG. 5 illustrates an example system for submitting and processing system information modification indicators in accordance with various aspects.

In view of the above, FIG. 5 illustrates a system 500 that can be utilized to facilitate efficient management of DRX and paging activity for a UE 520 operating in connected mode. In accordance with one aspect, system 500 can include a E-UTRAN 510, which utilizes a system information modification signaling module 512 and/or any other suitable component(s) to provide indications of a change of system parameters to occur within a given system modification period. In one example, change indications can be transmitted by E-UTRAN 510 in a similar manner to that illustrated by diagram 400 in FIG. 4, wherein change indications are provided over m paging occasions within a given system modification period. It can be appreciated that m can be any suitable value and can be less than, equal to, or greater than the total number of paging occasions in a system modification period (e.g., as determined by the length of the system modification period in subframes divided by $L_{Paging}$). Further, it can be appreciated that any suitable change indication can be provided by E-UTRAN 510, such as a systeminfoModification indication and/or an indication of any other suitable type(s).

In accordance with another aspect, a UE 520 associated with E-UTRAN 510 can utilize a system information modification detection module 522 and/or any other suitable module(s) to attempt detection of respective change indications transmitted by E-UTRAN 510, based on which UE 510 can determine whether system modification is to occur. In one example, UE 520 can verify that stored system information associated with E-UTRAN 510 remains valid by attempting to find a systeminfoModification indication and/or other suitable change indications at least a predetermined number (e.g., k or modificationPeriodCoeff) of times during a given modification period. Subsequently, if the predetermined number of indications is not detected, UE 520 can be configured to assume that no change of system information will occur at the following modification period boundary. Otherwise, if the predetermined number of indications is found, UE 520 can be configured to prepare for a change of system information at the following modification period. In one example, the required number of indications can be configured by E-UTRAN 510, UE 520, and/or any other entity associated with system 500 and can be any appropriate value less than or equal to the number m of times a change indication is provided in a modification period.

In accordance with an additional aspect, UE 520 can further include a DRX coordinator 524 and/or any other suitable module(s) for managing DRX activity of UE 520 in connected mode (e.g., RRC_CONNECTED). In one example, DRX coordinator 524 can manage the reception of data, control signaling, and/or other suitable information from E-UTRAN 510 according to a DRX cycle, as described above with respect to diagram 400. However, as further described above with respect to diagram 400, timing differences between a connected mode DRX cycle and a paging DRX cycle can cause UE 520 to incur a significant amount of unnecessary wakeup periods and resulting power efficiency loss in some cases.

Accordingly, UE 520 can further include a schedule modifier 526, which can enable UE 520 to alter its schedule for paging reception in order to optimize the power efficiency of UE 520. In one example, schedule modifier 526 can adjust a paging schedule associated with UE 520 while in connected mode in order to maximize the number of paging occasions that are monitored while UE 520 is active due to connected mode DRX, thereby minimizing the number of occurrences in which UE 520 must incur additional wakeup periods specifically to monitor for paging occasions. Thus, it can be appreciated that schedule modifier 526 can optimize the behavior of UE 520 such that UE 520 reliably receives any indication of a system information change without being forced to wake up independently for both its DRX occasions and its paging occasions.

By way of example, schedule modifier 526 can facilitate a unilateral determination to modify the reception schedule of UE 520 in connected mode to facilitate the reception of a required number k of pages from among m change indication pages in a given system modification period in the following manner. First, schedule modifier 526 can analyze the DRX cycle of UE 520 and configure UE 520 such that monitoring is performed for any paging occasions scheduled during DRX wakeup periods associated with UE 520 that are among the m paging occasions used for providing change indications in a given modification period. Thus, it can be appreciated that if at least the required number k of paging occasions meets this criterion, sufficient reception of the change notification can be satisfied without requiring further action. Alternatively, if the DRX cycle of UE 520 does not cause UE 520 to be active for at least k paging occasions in a modification period, schedule modifier 526 can facilitate selection of one or more additional paging occasions for which UE 520 can be activated to facilitate reception (e.g., over a Physical Downlink Control Channel (PDCCH)).

Figure 6:
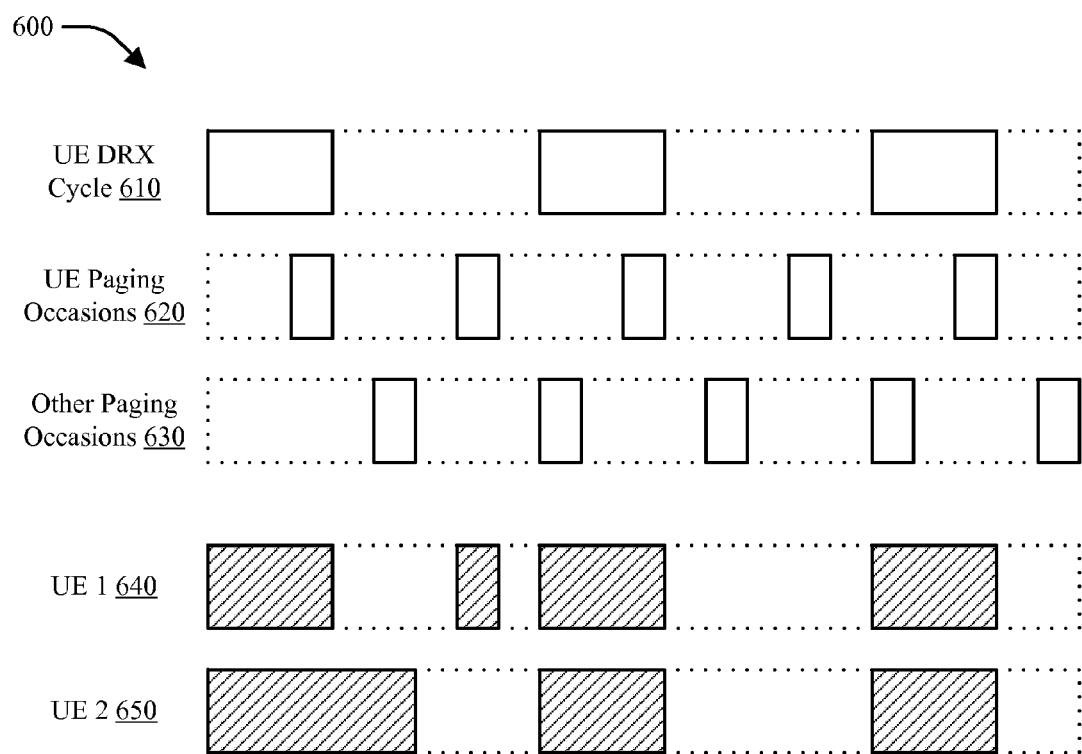
FIG. 6 illustrates example techniques for paging and DRX management in accordance with various aspects.

Various examples of such a selection that can be performed by schedule modifier 526 are illustrated by diagram 600 in FIG. 6. As diagram 600 illustrates, a set of UEs 640-650 can be configured with a common UE DRX cycle 610 on which DRX occasions can occur and a common paging cycle 620 on which paging occasions can occur. Further, a second paging cycle 630 can be utilized by an associated network to convey paging occasions at disparate intervals in time from the paging cycle 620 associated with UEs 640-650.

In the example illustrated by diagram 600, UE DRX cycle 610 and paging DRX cycle 620 coincide at three points in the illustrated time period. Thus, UEs 640-650 can be configured to monitor the three paging occasions in paging DRX cycle 620 that occur at times in which the UEs 640-650 are active due to UE DRX cycle 610. However, in an example scenario in which reception of four paging occasions is required, UEs 640-650 can choose an additional paging occasion to monitor in various manners as illustrated. In a first example as illustrated by UE 640, a UE can be configured to wake up for its regular idle-mode paging occasions as they occur outside a DRX period until at least k paging occasions have been monitored. Thus, as illustrated, UE 640 can obtain its fourth required paging occasion from any of its own regular idle-mode paging occasions. In a second example as illustrated by UE 650, a UE can instead be configured to stay awake for the next paging occasion after a DRX wakeup period and/or for reception of several paging occasions in a row. Thus, as illustrated, UE 650 can obtain its fourth required paging occasion by extending any of its DRX wakeup periods until an immediately following paging occasion that falls on the paging cycle 630 not associated with UE 650.

Figure 7:
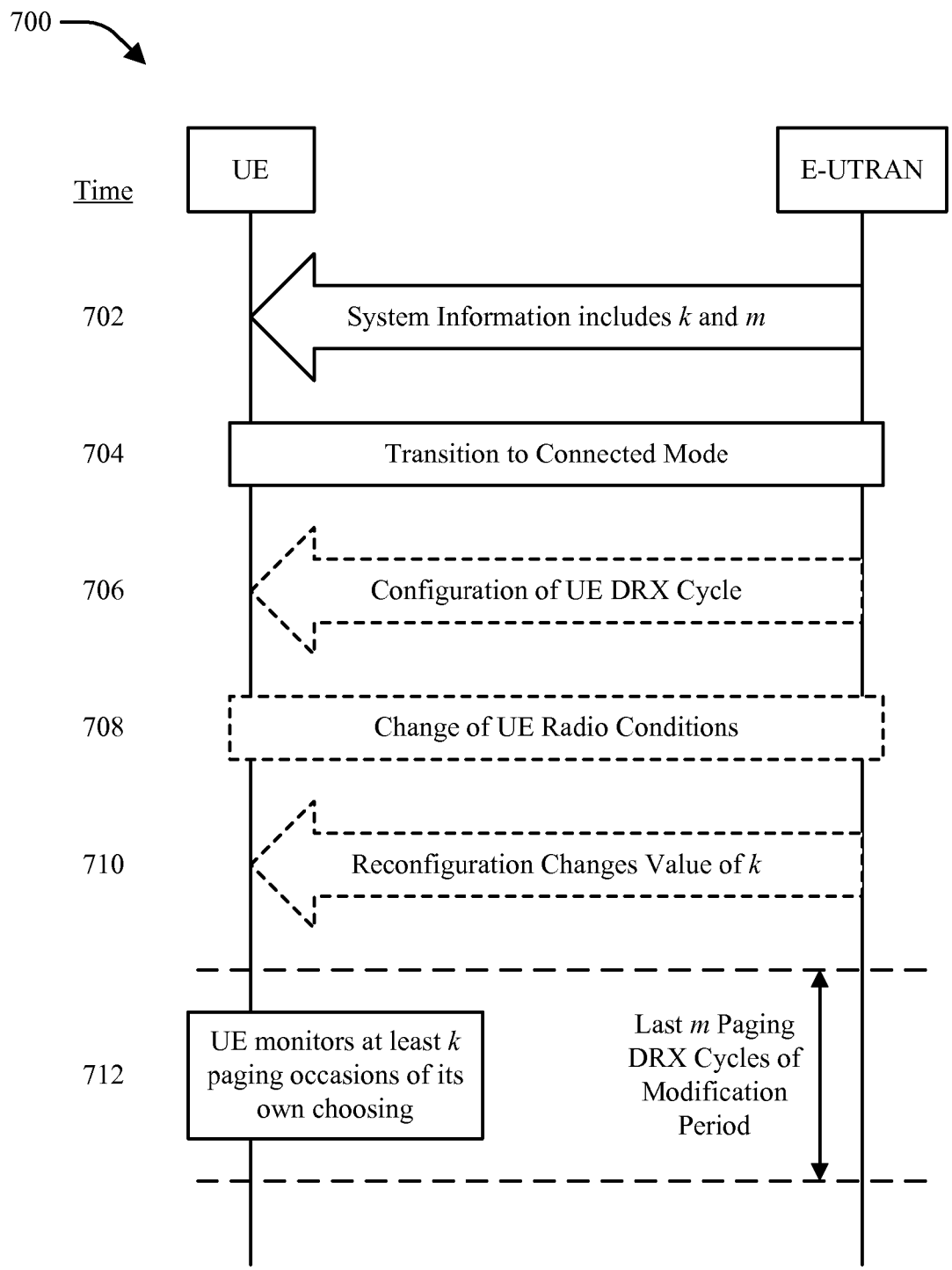
FIG. 7 is a timing diagram that illustrates example techniques for configuring paging parameters of a wireless device in accordance with various aspects.

Turning next to FIG. 7, a timing diagram 700 is provided that illustrates example techniques for configuring paging parameters of a wireless device in accordance with various aspects. In particular, timing diagram 700 illustrates a series of acts that can be performed between a UE and an associated E-UTRAN to facilitate configuration of respective paging parameters of the UE. In one example, a UE can in some cases elect to monitor fewer paging occasions than the total number of paging occasions in a modification period. This is illustrated by diagram 600, wherein during a pre-modification window of length m=5 paging DRX cycles, UEs 640-650 are configured to monitor only k=4 paging occasions.

In order to facilitate this optimization, E-UTRAN can, in accordance with one aspect, signal parameters k, m, and/or one or more other suitable parameters to an associated UE prior to the UE monitoring for paging occasions. More particularly, an E-UTRAN can initiate configuration of a UE as shown at time 702, wherein system information is signaled from the E-UTRAN to the UE. In one example, the value of m (e.g., the period before a modification period during which the E-UTRAN intends to indicate an upcoming change) can be system-wide and signalled as part of the system information as shown at time 702. As further shown at time 702, the value of k can be system-wide and signalled as system information. Alternatively, k can be configured on a UE-by-UE basis and transmitted to respective UEs using dedicated signalling for at least a portion of associated UEs.

In accordance with another aspect, upon receiving parameters for k and m at time 702, a UE receiving such parameters can transition to connected mode at time 704. Subsequently, at time 712, the UE can monitor at least k paging occasions of its own choosing during the last m paging DRX cycles of an associated modification period. Monitoring at time 712 can occur in accordance with any suitable monitoring techniques as generally described herein.

In an alternative example, an E-UTRAN can facilitate optional reconfiguration of a given UE as illustrated at one or more of times 706-710 in addition to the basic configuration and monitoring operation illustrated at times 702-704 and 712. For example, upon transition by a UE to connected mode as shown at time 704, an associated E-UTRAN can reconfigure the DRX cycle associated with the UE at time 706. For example, at time 706, the E-UTRAN can additionally reconfigure the value of k, m, and/or one or more other parameters with respect to the particular UE under reconfiguration at time 706. By way of specific example, the E-UTRAN can reconfigure k for a given UE at time 706 to relax the monitoring requirements for the UE. Additionally and/or alternatively, in the event that it is determined that the radio conditions of a UE change in a way that affects paging coverage and/or other factors (e.g., as shown at time 708), the E-UTRAN can facilitate reconfiguration of k and/or any other paging parameters utilized by the UE at time 710 in view of the change of radio conditions. In one example, an E-UTRAN can be configured to monitor for radio conditions of a UE and perform appropriate reconfiguration as illustrated at times 708-710 in real time.

Figure 8:
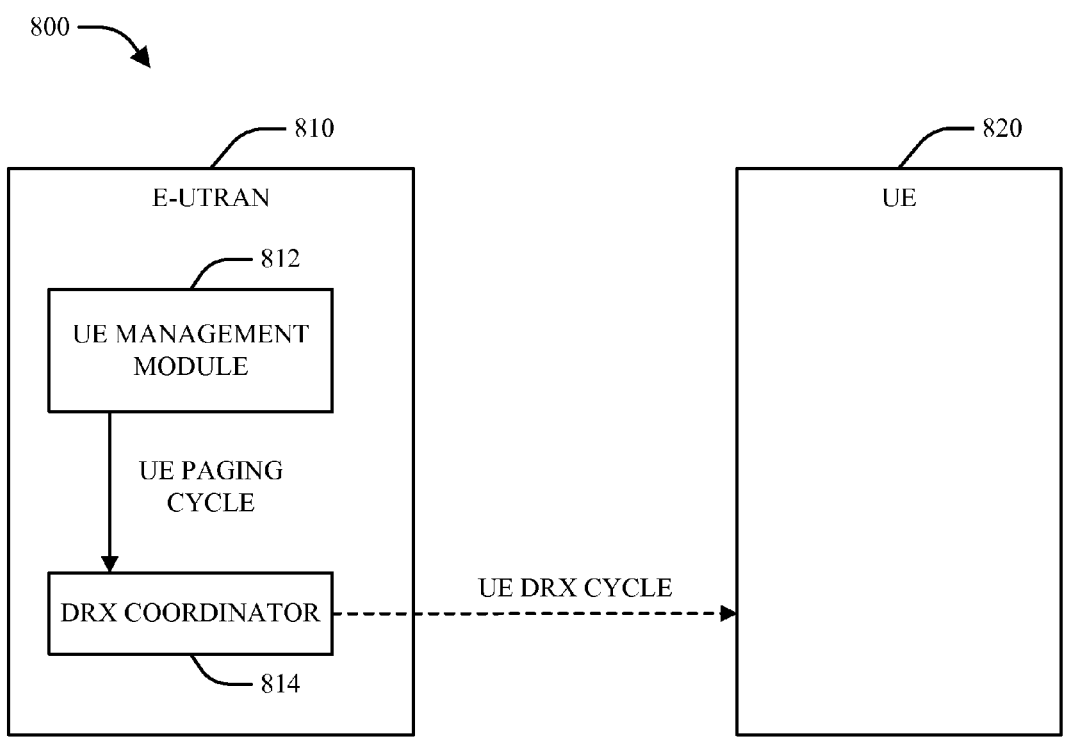
FIG. 8 is a block diagram of a system that facilitates network-based coordination between paging and DRX cycles in accordance with various aspects.

Referring next to FIG. 8, a system that facilitates network-based coordination between paging and DRX cycles in accordance with various aspects is illustrated. In accordance with one aspect, in a network implementation wherein a UE 820 is not configured and/or otherwise unable to monitor suitable paging occasions associated with a change of system information, an E-UTRAN 810 associated with the UE 820 can be configured to synchronize occurrences of the paging cycle associated with UE 820 with its DRX cycle in order to allow a substantial portion of paging occasions associated with a UE to be received during DRX occasions associated with the UE 820. In one example, the above synchronization can be performed by E-UTRAN 810 using a UE management module 812, a DRX coordinator 814, and/or any other suitable component(s). For example, UE management module 812 can be utilized to obtain information relating to the paging cycle of a given UE 820. Based on said information, DRX coordinator 814 can be utilized to assign a DRX cycle to UE 820 that resonates with the paging cycle of UE 820.

By way of example, DRX coordinator 814 can operate in the following manner to derive a DRX cycle for a given UE 820. Initially, it can be observed that the on duration of a DRX cycle can be configured to start at a given set of subframes, which can be defined by the set of subframes that satisfy the following:

$$[(SFN \times 10) + \text{subframe number}] \mod (\text{current DRX Cycle}) = \text{DRX Start Offset},$$

where SFN indicates a system frame number. Further, it can be observed that a given paging occasion can occur in a given radio frame (e.g., paging frame) having a SFN that satisfies the following equation:

$$SFN \mod T = (T/N) \times (UE\_ID \mod N),$$

where T is the length of the paging cycle in radio frames (e.g., 32, 64, 128, 256, ...), N is a Paging Group Count on a radio frame level (e.g., 2, 4, 8, 16, ..., where N≤T), and UE_ID is an identifier of UE 820. Additionally, within the paging frame, it can be observed that a subframe $i_S$ containing a paging occasion can be derived as follows:

$$i_S = (UE\_ID/N) \mod Ns,$$

where Ns is an indicator of the number of paging occasions that are utilized in a given radio frame (e.g., 1, 2, 3, 4, ...)

Accordingly, in order to align the DRX and paging cycles of UE 820, DRX coordinator 814 can set the DRX cycle of UE 820 such that the DRX Start Offset of the DRX cycle is equal to the offset from a frame boundary where the paging DRX cycle of UE 820 would start in idle mode, e.g., such that DRX Start Offset=$i_S$. Additionally or alternatively, DRX coordinator 814 can set the length of the DRX cycle for UE 820 to either divide or be a multiple of the length T of the paging cycle for UE 820 (e.g., 320 ms). By performing one or more of the above operations, it can be appreciated that DRX coordinator 814 can synchronize the DRX and paging cycles of UE 820, thereby minimizing the wake time required by UE 820 in monitoring paging and DRX information during a modification period.

Referring now to FIGS. 9-12, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 9:
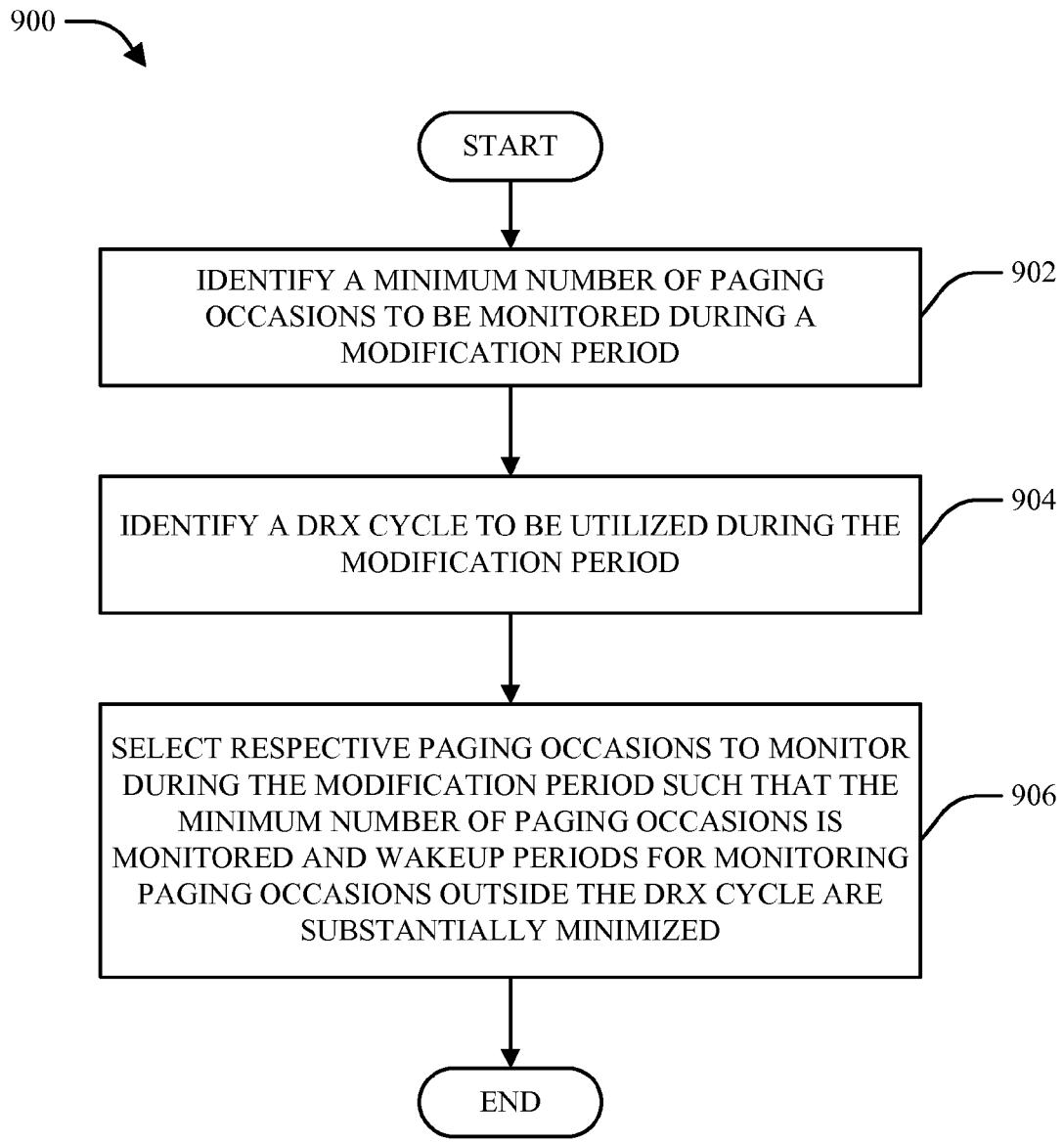
FIG. 9 is a flow diagram of a methodology for coordinating paging and DRX operation during a system information modification period.
Figure 10:
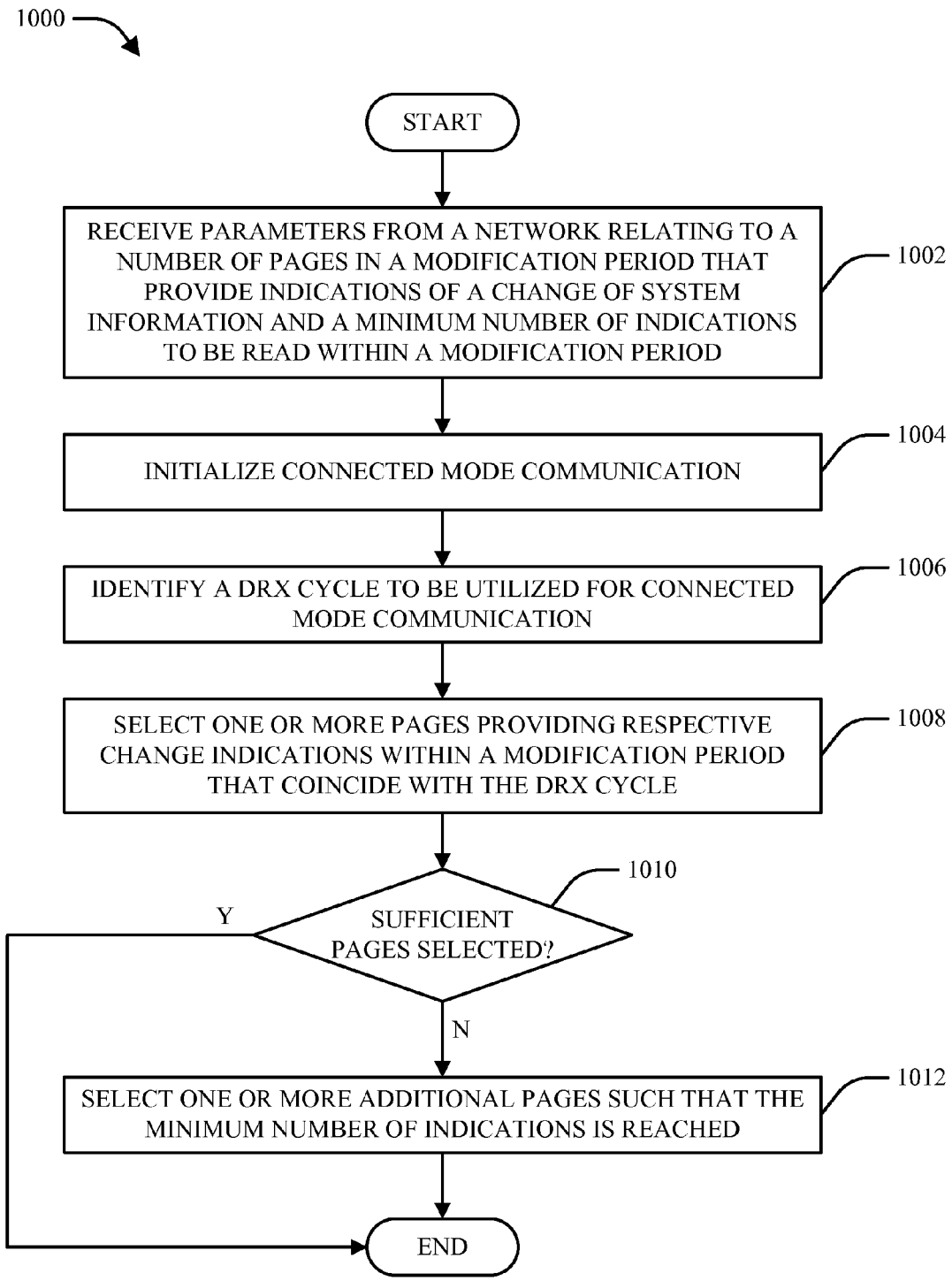
FIG. 10 is a flow diagram of a methodology for managing interaction between paging cycles and DRX cycles based on configuration signaling.

With reference to FIG. 9, illustrated is a methodology 900 for coordinating paging and DRX operation during a system information modification period. It is to be appreciated that methodology 900 can be performed by, for example, a UE (e.g., UE 520) and/or any other appropriate network device. Methodology 900 begins at block 902, wherein a minimum number of paging occasions to be monitored during a modification period (e.g., a number k or modificationPeriodCoeff of paging occasions among m that provide indications of a system information change in a modification period) is identified. Next, at block 904, a DRX cycle to be utilized during the modification period is identified. Methodology 900 can then conclude at block 906, wherein respective paging occasions in a modification period are selected for monitoring (e.g., by a DRX coordinator 524 and/or schedule modifier 526) such that the minimum number of paging occasions identified at block 902 is monitored and wakeup periods for monitoring paging occasions outside the DRX cycle identified at block 904 are minimized Turning to FIG. 10, a methodology 1000 is illustrated for managing interaction between paging cycles and DRX cycles based on configuration signaling. Methodology 1000 can be performed by, for example, a mobile terminal and/or any other suitable network entity. Methodology 1000 begins at block 1002, wherein parameters are received from a network (e.g., E-UTRA 510) relating to a number of pages (e.g., m) in a modification period that provide indications of a change of system information and a minimum number of indications to be read within a modification period (e.g., k or modificationPeriodCoeff). Next, at block 1004, connected mode communication (e.g., associated with an RRC_CONNECTED state) is initialized. At block 1006, a DRX cycle to be utilized for the connected mode communication initialized at block 1004 is identified. In one example, a DRX cycle can be identified at block 1006 independently by an entity performing methodology 1000, based on information signaled from an associated network, and/or based on any other suitable technique(s).

Methodology 1000 can then proceed to block 1008, wherein one or more pages providing respective change indications during a given modification period that coincide with the DRX cycle identified at block 1006 are selected for monitoring. At block 1010, it is then determined whether the pages selected at block 1008 are sufficient to satisfy the minimum number of indications provided by the network at block 1002. If the number of pages selected at block 1008 is sufficient, no further action is necessary and methodology 1000 can conclude. Otherwise, methodology 1000 can proceed to block 1012 prior to concluding, wherein one or more additional pages are selected such that the minimum number of indications provided at block 1002 can be read. By way of specific example, additional pages falling outside the DRX cycle identified at block 1006 can be read as shown in diagram 600 by incurring additional wakeup periods from the identified DRX cycle, extending wakeup periods associated with the DRX cycle, and/or by using any other appropriate technique(s).

Figure 11:
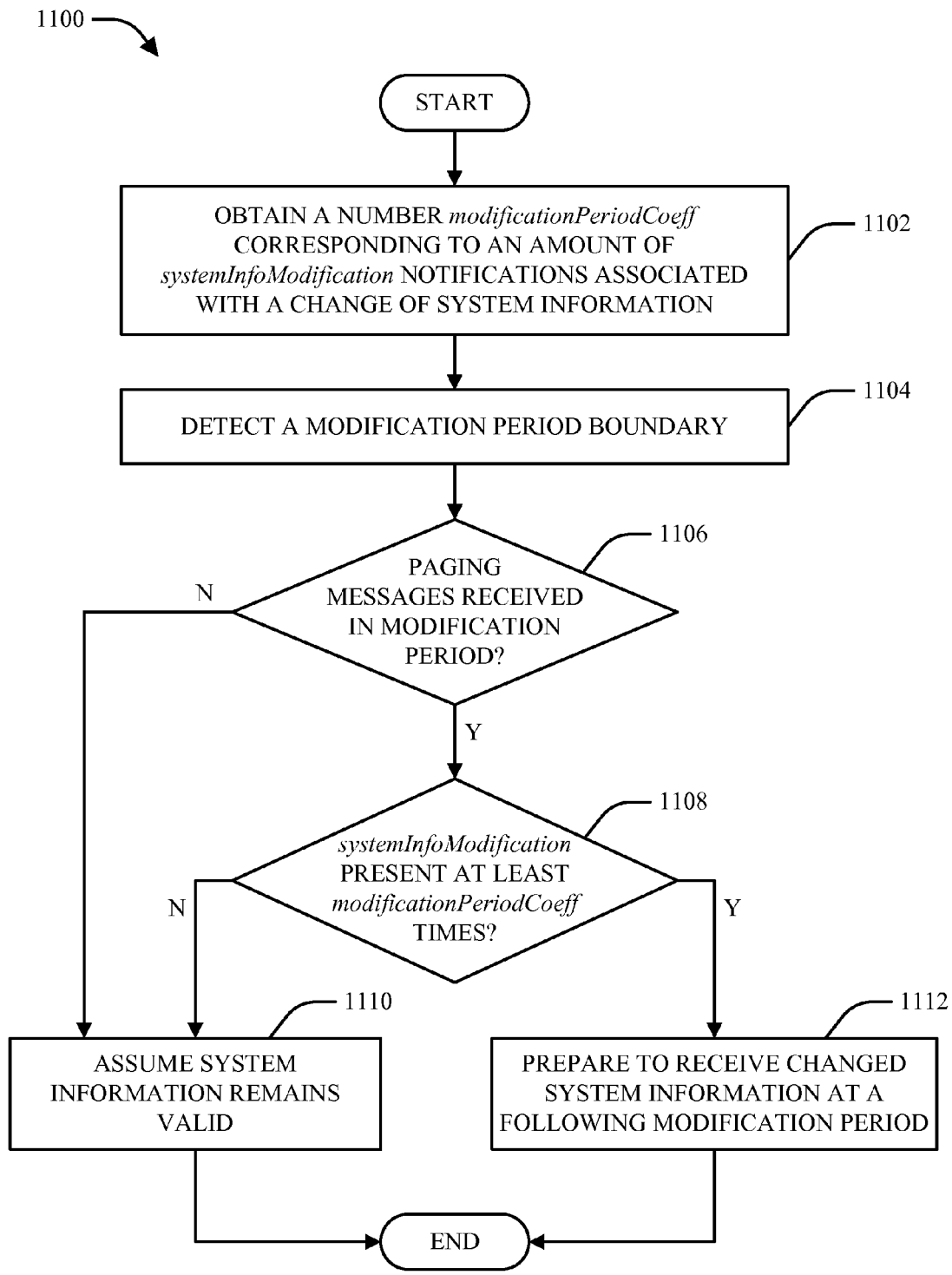
FIG. 11 is a flow diagram of a methodology for assessing validity of system information associated with a wireless communication network.

FIG. 11 illustrates a methodology 1100 for assessing validity of system information associated with a wireless communication network. Methodology 1100 can be performed by, for example, a UE and/or any other suitable network device. Methodology 1100 begins at block 1102, wherein a number modificationPeriodCoeff corresponding to an amount of systeminfoModification notifications that are associated with a change of system information at a given modification period is obtained. Next, at block 1104, a modification period boundary is detected. At block 1106, it is then determined whether paging messages are received in the modification period for which the boundary was detected at block 1104. If no paging messages are received, an entity performing methodology 1100 can assume that its presently stored system information remains valid, as shown at block 1110, and conclude methodology 1100. Otherwise, methodology 1100 can proceed to block 1108, wherein it is determined whether a systeminfoModification signal is present at least modificationPeriodCoeff times in paging messages received in the modification period. If such indications are not present, methodology 1100 can proceed to block 1110 and conclude as described above. In contrast, if such modifications are received, methodology 1100 can instead proceed to block 1112 prior to concluding, wherein preparations to receive changed system information at a following modification period are made.

Figure 12:
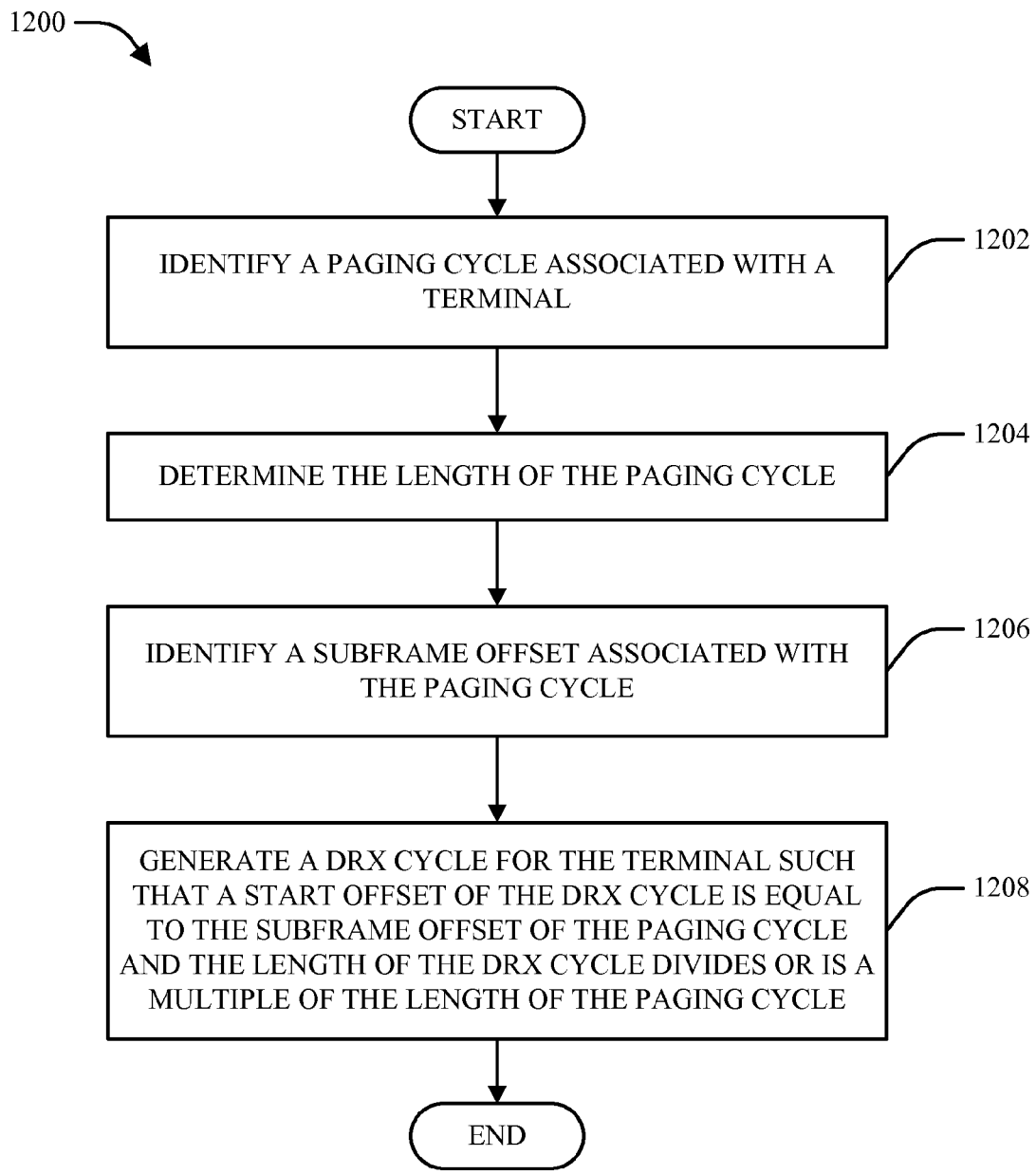
FIG. 12 is a flow diagram of a methodology for structuring DRX cycles associated with a wireless terminal

Referring next to FIG. 12, a methodology 1200 for structuring DRX cycles associated with a wireless terminal is illustrated. It is to be appreciated that methodology 1200 can be performed by, for example, an access point (e.g., associated with an E-UTRAN 810) and/or any other appropriate network device. Methodology 1200 begins at block 1202, wherein a paging cycle associated with a terminal (e.g., UE 820) is identified (e.g., by a UE management module 812). Methodology 1200 can then proceed to block 1202, wherein the length of the paging cycle (e.g., T) is determined, and to block 1204, wherein a subframe offset associated with the paging cycle (e.g., $i_S$) is identified. Methodology 1200 can then conclude at block 1208, wherein a DRX cycle is generated for the terminal (e.g., by a DRX coordinator 814) such that a start offset of the DRX cycle is equal to the subframe offset of the paging cycle and the length of the DRX cycle divides or is a multiple of the length of the paging cycle.

Figure 13:
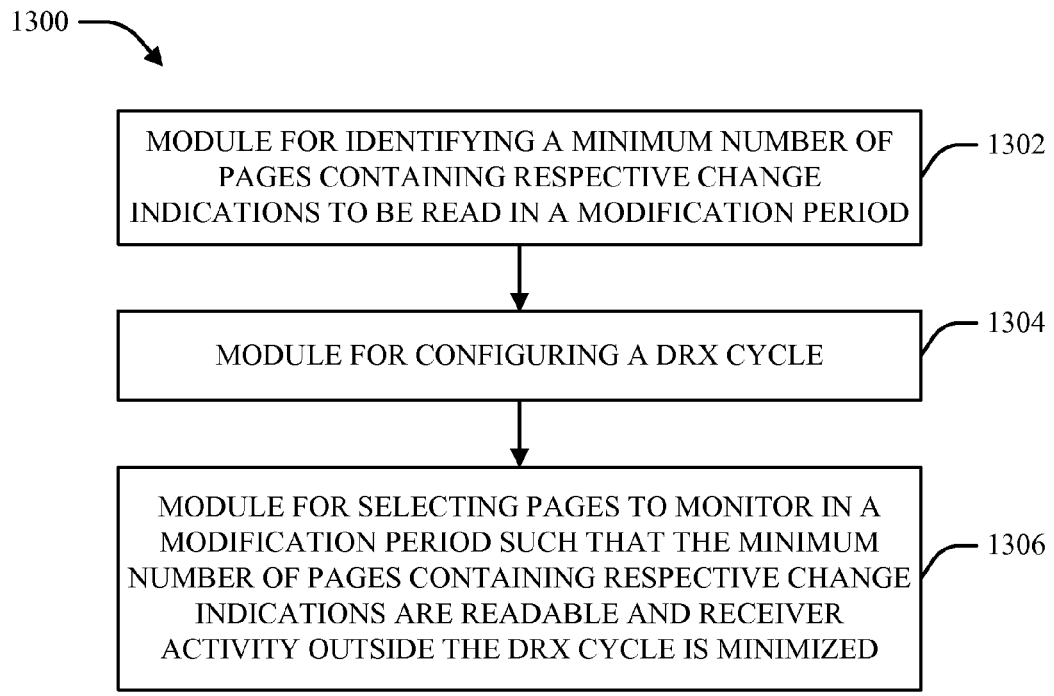
FIGS. 13-14 are block diagrams of respective apparatuses that facilitate coordination of DRX and paging operation in a wireless communication system.

FIG. 13 illustrates an apparatus 1300 that facilitates coordination of DRX and paging operation in a wireless communication system. It is to be appreciated that apparatus 1300 is represented as including functional blocks, which can be functional blocks that represent functions implemented by a processor, software, or combination thereof (e.g., firmware). Apparatus 1300 can be implemented by a wireless terminal (e.g., UE 520) and/or any other suitable network device and can include a module 1302 for identifying a minimum number of pages containing respective change indications to be read in a modification period, a module 1304 for configuring a DRX cycle, and a module 1306 for selecting pages to monitor in a modification period such that the minimum number of pages containing respective change indications are readable and receiver activity outside the DRX cycle is minimized.

Figure 14:
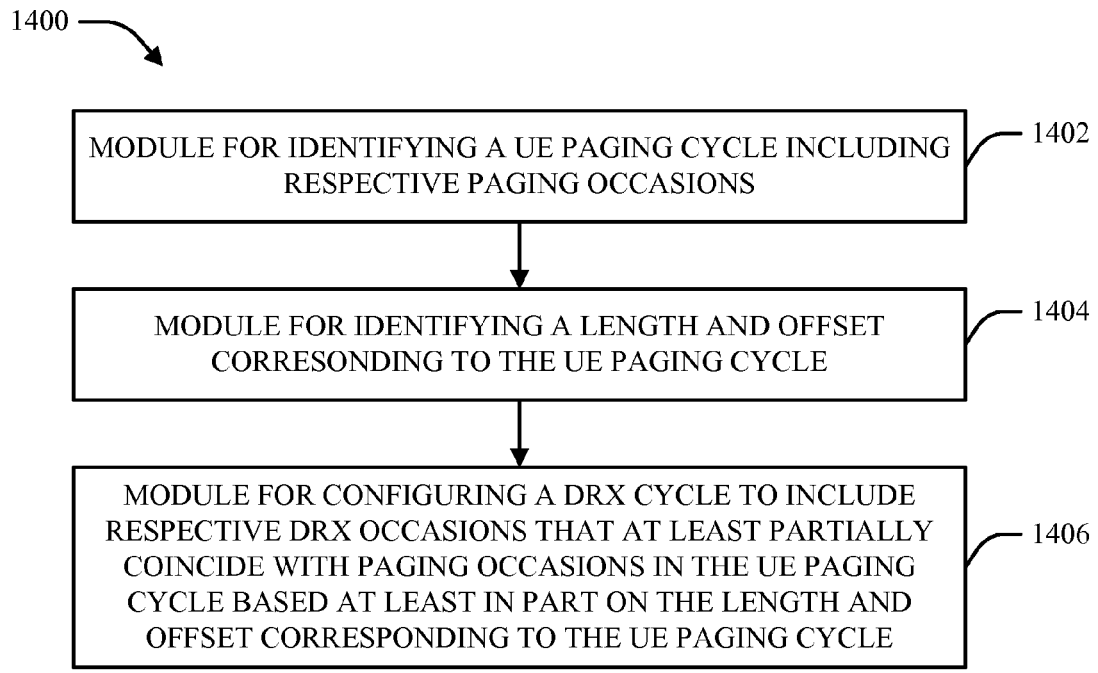

FIG. 14 illustrates another apparatus 1400 that facilitates coordination of DRX and paging operation in a wireless communication system. It is to be appreciated that apparatus 1400 is represented as including functional blocks, which can be functional blocks that represent functions implemented by a processor, software, or combination thereof (e.g., firmware). Apparatus 1400 can be implemented by an eNB (e.g., associated with E-UTRAN 810) and/or any other suitable network device and can include a module 1402 for identifying a UE paging cycle including respective paging occasions, a module 1404 for identifying a length and offset corresponding to the UE paging cycle, and a module 1406 for configuring a DRX cycle to include respective DRX occasions that at least partially coincide with paging occasions in the UE paging cycle based at least in part on the length and offset corresponding to the UE paging cycle.

Figure 15:
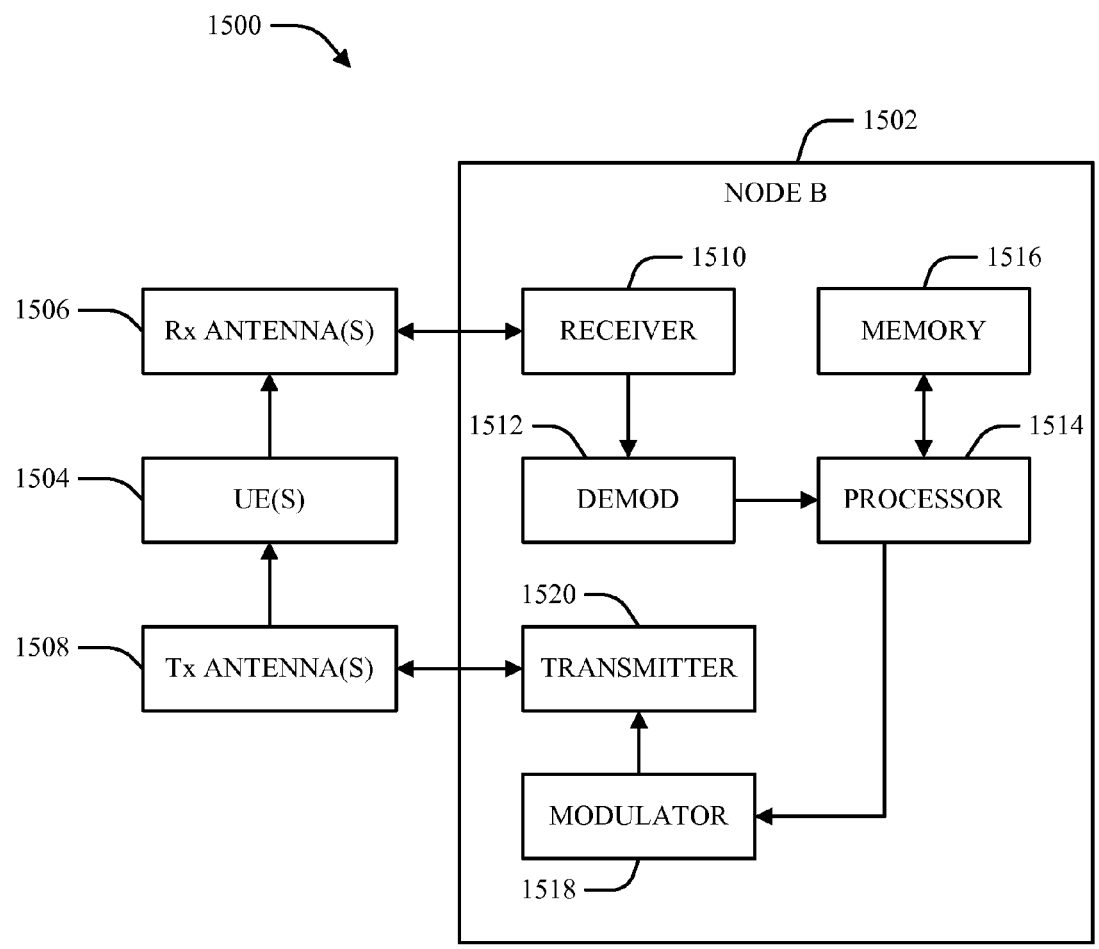
FIGS. 15-16 are block diagrams of respective wireless communication devices that can be utilized to implement various aspects of the functionality described herein.

FIG. 15 is a block diagram of a system 1500 that can be utilized to implement various aspects of the functionality described herein. In one example, system 1500 includes a base station or Node B 1502. As illustrated, Node B 1502 can receive signal(s) from one or more UEs 1504 via one or more receive (Rx) antennas 1506 and transmit to the one or more UEs 1504 via one or more transmit (Tx) antennas 1508. Additionally, Node B 1502 can comprise a receiver 1510 that receives information from receive antenna(s) 1506. In one example, the receiver 1510 can be operatively associated with a demodulator (Demod) 1512 that demodulates received information. Demodulated symbols can then be analyzed by a processor 1514. Processor 1514 can be coupled to memory 1516, which can store information related to code clusters, access terminal assignments, lookup tables related thereto, unique scrambling sequences, and/or other suitable types of information. Additionally, Node B 1502 can employ processor 1514 to perform methodology 1200 and/or other similar and appropriate methodologies. In one example, Node B 1502 can also include a modulator 1518 that can multiplex a signal for transmission by a transmitter 1520 through transmit antenna(s) 1508.

Figure 16:
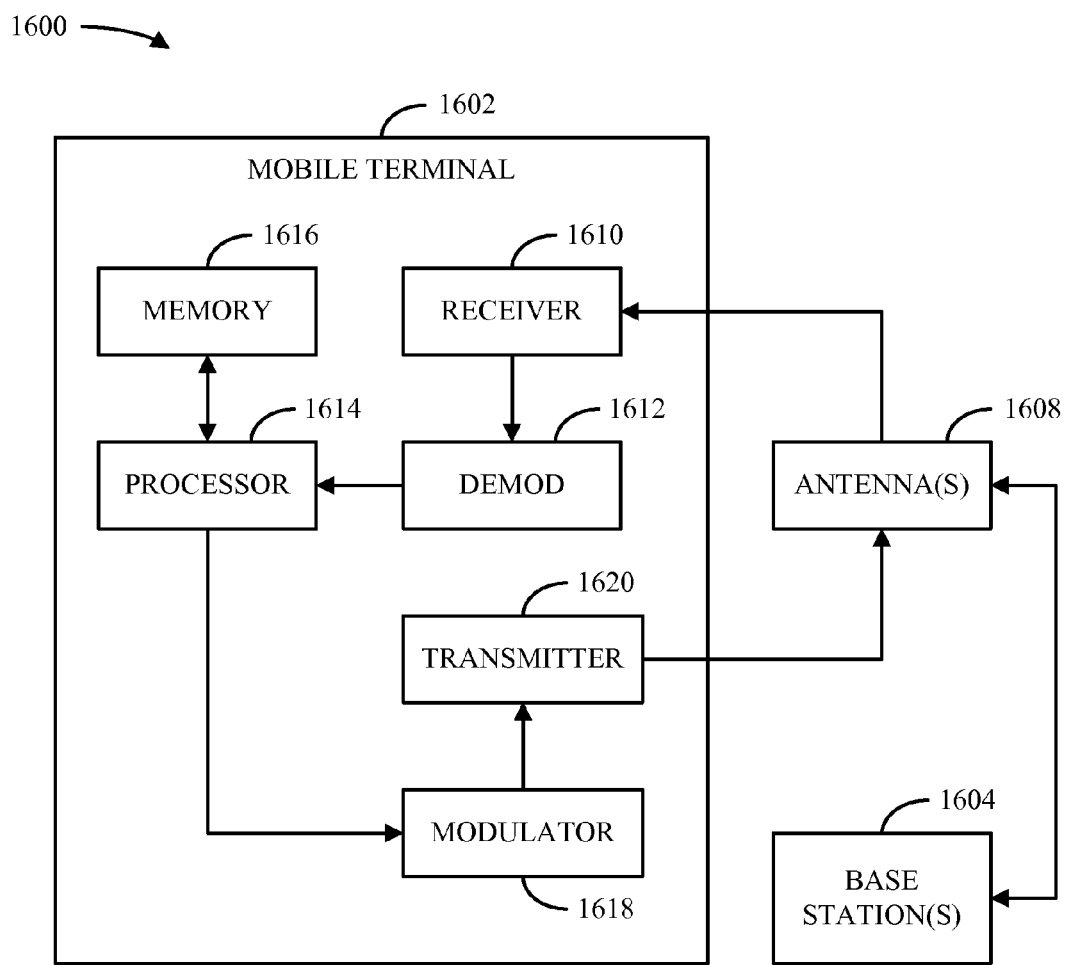

FIG. 16 is a block diagram of another system 1600 that can be utilized to implement various aspects of the functionality described herein. In one example, system 1600 includes a mobile terminal 1602. As illustrated, mobile terminal 1602 can receive signal(s) from one or more base stations 1604 and transmit to the one or more base stations 1604 via one or more antennas 1608. Additionally, mobile terminal 1602 can comprise a receiver 1610 that receives information from antenna(s) 1608. In one example, receiver 1610 can be operatively associated with a demodulator (Demod) 1612 that demodulates received information. Demodulated symbols can then be analyzed by a processor 1614. Processor 1614 can be coupled to memory 1616, which can store data and/or program codes related to mobile terminal 1602. Additionally, mobile terminal 1602 can employ processor 1614 to perform methodologies 900-1100 and/or other similar and appropriate methodologies. Mobile terminal 1602 can also include a modulator 1618 that can multiplex a signal for transmission by a transmitter 1620 through antenna(s) 1608.

Figure 17:
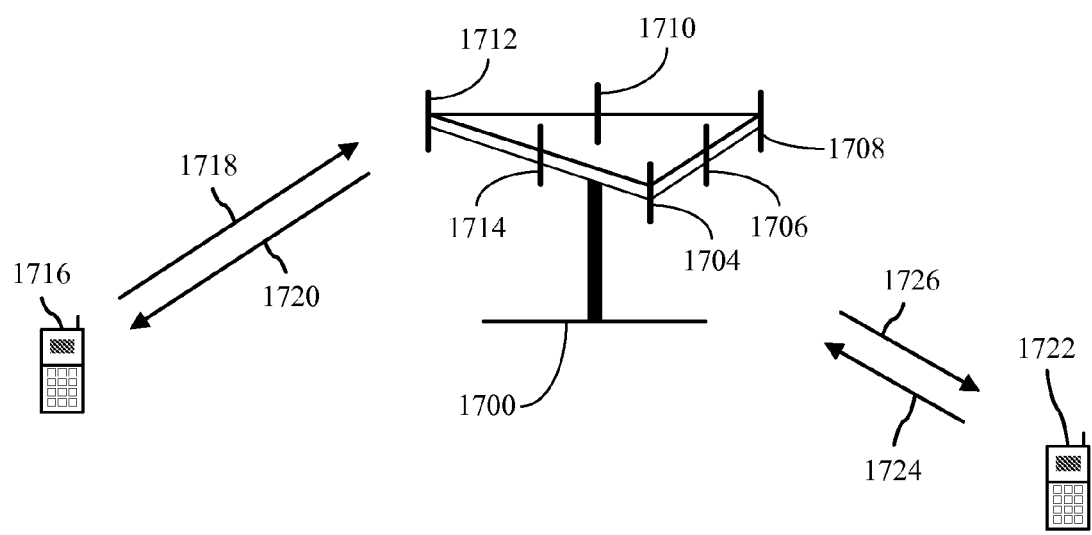
FIG. 17 illustrates a wireless multiple-access communication system in accordance with various aspects set forth herein.

Referring now to FIG. 17, an illustration of a wireless multiple-access communication system is provided in accordance with various aspects. In one example, an access point 1700 (AP) includes multiple antenna groups. As illustrated in FIG. 17, one antenna group can include antennas 1704 and 1706, another can include antennas 1708 and 1710, and another can include antennas 1712 and 1714. While only two antennas are shown in FIG. 17 for each antenna group, it should be appreciated that more or fewer antennas may be utilized for each antenna group. In another example, an access terminal 1716 can be in communication with antennas 1712 and 1714, where antennas 1712 and 1714 transmit information to access terminal 1716 over forward link 1720 and receive information from access terminal 1716 over reverse link 1718. Additionally and/or alternatively, access terminal 1722 can be in communication with antennas 1706 and 1708, where antennas 1706 and 1708 transmit information to access terminal 1722 over forward link 1726 and receive information from access terminal 1722 over reverse link 1724. In a frequency division duplex system, communication links 1718, 1720, 1724 and 1726 can use different frequency for communication. For example, forward link 1720 may use a different frequency then that used by reverse link 1718.

Each group of antennas and/or the area in which they are designed to communicate can be referred to as a sector of the access point. In accordance with one aspect, antenna groups can be designed to communicate to access terminals in a sector of areas covered by access point 1700. In communication over forward links 1720 and 1726, the transmitting antennas of access point 1700 can utilize beamforming in order to improve the signal-to-noise ratio of forward links for the different access terminals 1717 and 1722. Also, an access point using beamforming to transmit to access terminals scattered randomly through its coverage causes less interference to access terminals in neighboring cells than an access point transmitting through a single antenna to all its access terminals.

An access point, e.g., access point 1700, can be a fixed station used for communicating with terminals and can also be referred to as a base station, an eNB, an access network, and/or other suitable terminology. In addition, an access terminal, e.g., an access terminal 1716 or 1722, can also be referred to as a mobile terminal, user equipment, a wireless communication device, a terminal, a wireless terminal, and/or other appropriate terminology.

Figure 18:
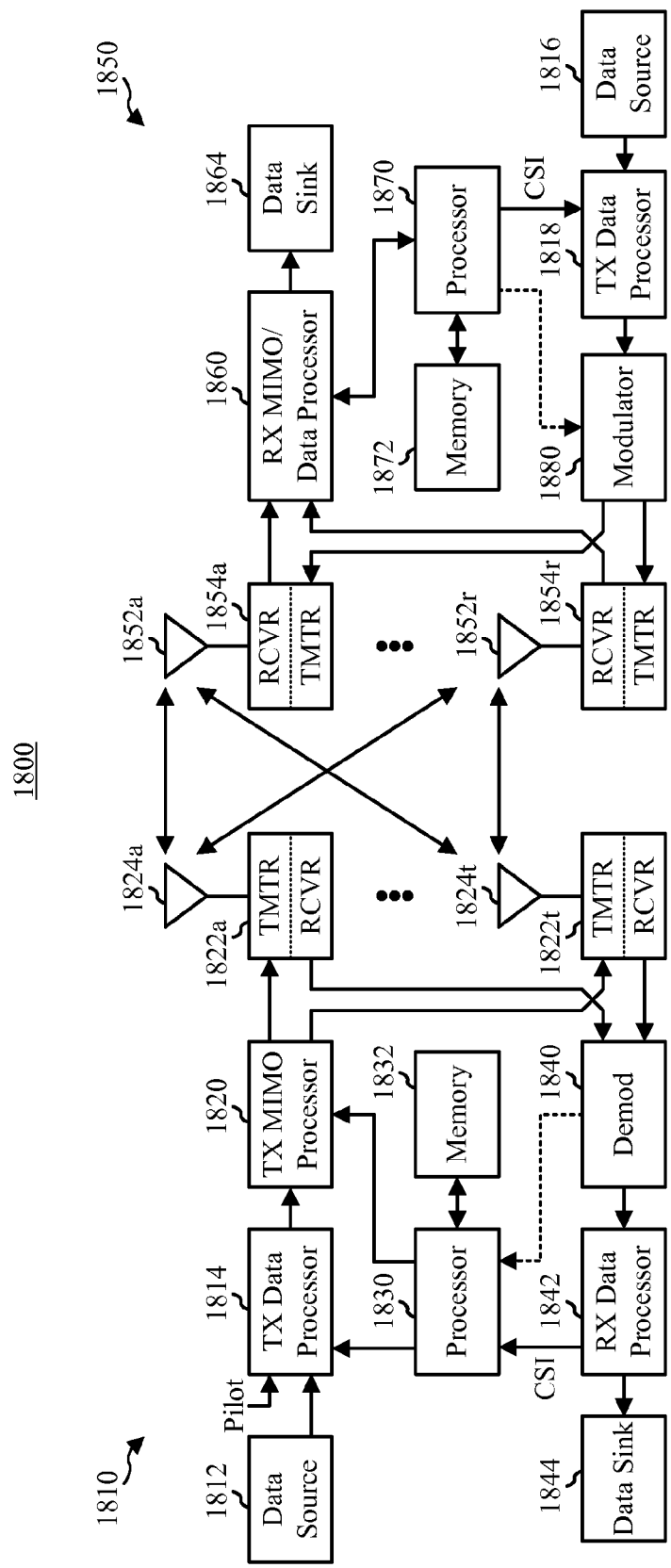
FIG. 18 is a block diagram illustrating an example wireless communication system in which various aspects described herein can function.

Referring now to FIG. 18, a block diagram illustrating an example wireless communication system 1800 in which various aspects described herein can function is provided. In one example, system 1800 is a multiple-input multiple-output (MIMO) system that includes a transmitter system 1810 and a receiver system 1850. It should be appreciated, however, that transmitter system 1810 and/or receiver system 1850 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1810 and/or receiver system 1850 described herein could be utilized in connection with a single output to single input antenna system.

In accordance with one aspect, traffic data for a number of data streams are provided at transmitter system 1810 from a data source 1812 to a transmit (TX) data processor 1814. In one example, each data stream can then be transmitted via a respective transmit antenna 1824. Additionally, TX data processor 1814 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1850 to estimate channel response. Back at transmitter system 1810, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1830.

Next, modulation symbols for all data streams can be provided to a TX processor 1820, which can further process the modulation symbols (e.g., for OFDM). TX MIMO processor 1820 can then provides $N_T$ modulation symbol streams to $N_T$ transceivers 1822a through 1822t. In one example, each transceiver 1822 can receive and process a respective symbol stream to provide one or more analog signals. Each transceiver 1822 can then further condition (e.g., amplify, filter, and upconvert) the analog signals to provide a modulated signal suitable for transmission over a MIMO channel. Accordingly, $N_T$ modulated signals from transceivers 1822a through 1822t can then be transmitted from $N_T$ antennas 1824a through 1824t, respectively.

In accordance with another aspect, the transmitted modulated signals can be received at receiver system 1850 by $N_R$ antennas 1852a through 1852r. The received signal from each antenna 1852 can then be provided to respective transceivers 1854. In one example, each transceiver 1854 can condition (e.g., filter, amplify, and downconvert) a respective received signal, digitize the conditioned signal to provide samples, and then processes the samples to provide a corresponding "received" symbol stream. An RX MIMO/data processor 1860 can then receive and process the $N_R$ received symbol streams from $N_R$ transceivers 1854 based on a particular receiver processing technique to provide $N_T$ "detected" symbol streams. In one example, each detected symbol stream can include symbols that are estimates of the modulation symbols transmitted for the corresponding data stream. RX processor 1860 can then process each symbol stream at least in part by demodulating, deinterleaving, and decoding each detected symbol stream to recover traffic data for a corresponding data stream. Thus, the processing by RX processor 1860 can be complementary to that performed by TX MIMO processor 1820 and TX data processor 1816 at transmitter system 1810. RX processor 1860 can additionally provide processed symbol streams to a data sink 1864.

In accordance with one aspect, the channel response estimate generated by RX processor 1860 can be used to perform space/time processing at the receiver, adjust power levels, change modulation rates or schemes, and/or other appropriate actions. Additionally, RX processor 1860 can further estimate channel characteristics such as, for example, signal-to-noise-and-interference ratios (SNRs) of the detected symbol streams. RX processor 1860 can then provide estimated channel characteristics to a processor 1870. In one example, RX processor 1860 and/or processor 1870 can further derive an estimate of the "operating" SNR for the system. Processor 1870 can then provide channel state information (CSI), which can comprise information regarding the communication link and/or the received data stream. This information can include, for example, the operating SNR. The CSI can then be processed by a TX data processor 1818, modulated by a modulator 1880, conditioned by transceivers 1854a through 1854r, and transmitted back to transmitter system 1810. In addition, a data source 1816 at receiver system 1850 can provide additional data to be processed by TX data processor 1818.

Back at transmitter system 1810, the modulated signals from receiver system 1850 can then be received by antennas 1824, conditioned by transceivers 1822, demodulated by a demodulator 1840, and processed by a RX data processor 1842 to recover the CSI reported by receiver system 1850. In one example, the reported CSI can then be provided to processor 1830 and used to determine data rates as well as coding and modulation schemes to be used for one or more data streams. The determined coding and modulation schemes can then be provided to transceivers 1822 for quantization and/or use in later transmissions to receiver system 1850. Additionally and/or alternatively, the reported CSI can be used by processor 1830 to generate various controls for TX data processor 1814 and TX MIMO processor 1820. In another example, CSI and/or other information processed by RX data processor 1842 can be provided to a data sink 1844.

In one example, processor 1830 at transmitter system 1810 and processor 1870 at receiver system 1850 direct operation at their respective systems. Additionally, memory 1832 at transmitter system 1810 and memory 1872 at receiver system 1850 can provide storage for program codes and data used by processors 1830 and 1870, respectively. Further, at receiver system 1850, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   receiving a value identifying a minimum number of paging occasions configured for indicating a change of system information to be monitored during a modification period;
   identifying a discontinuous reception cycle to be utilized during the modification period;
   monitoring one or more paging occasions during the modification period for the minimum number of paging occasions configured for indicating the change of system information, wherein wakeup periods for the monitoring for the one or more paging occasions outside active intervals of the discontinuous reception cycle are reduced below a total number of paging occasions outside the active intervals of the discontinuous reception cycle; and
   determining that the change of system information was not received during the modification period upon completion of the monitoring the minimum number of paging occasions.

2. The method of claim 1, wherein the minimum number of paging occasions configured for indicating the change of system is substantially equal to a number of paging occasions within a set of paging occasions, and wherein the set of paging occasions is provided at respective predetermined positions within the modification period.

3. The method of claim 1, wherein the minimum number of paging occasions configured for indicating the change of system information is substantially equal to a number of paging occasions monitored within the modification period by a single user under normal operating conditions.

4. The method of claim 1, wherein the minimum number of paging occasions configured for indicating the change of system information is less than a number of paging occasions within a block of paging occasions.

5. The method of claim 1, further comprising receiving at least one of the following from an associated network: the value identifying the minimum number of paging occasions configured for indicating the change of system information to be monitored; a number of paging occasions in a block of paging occasions; the discontinuous reception cycle to be utilized, or any combination thereof.

6. The method of claim 1, wherein the identifying a discontinuous reception cycle comprises identifying a discontinuous reception cycle associated with connected mode operation.

7. The method of claim 1, wherein the identifying a discontinuous reception cycle comprises:
   detecting a change in radio conditions; and
   re-configuring the discontinuous reception cycle to be utilized during the modification period based on the change in radio conditions.

8. The method of claim 1, further comprising scheduling one or more periods of activity outside the discontinuous reception cycle for the monitoring.

9. The method of claim 1, further comprising extending one or more periods of activity associated with the discontinuous reception cycle for the monitoring.

10. A wireless communications apparatus, comprising:
    a memory that stores data relating to a threshold amount of system information modification indicators provided at respective paging occasions during a modification period and a connected mode discontinuous reception cycle comprising respective discontinuous reception occasions; and a processor configured to:
receive a value identifying the threshold amount,
monitor change of system information during a modification period for the threshold amount of system information modification indicators in the modification period,
determine that the change of system information was not received during the modification period, wherein activity outside active intervals of the discontinuous reception occasions associated with the discontinuous reception cycle is reduced below a total number of paging occasions outside the active intervals of the discontinuous reception cycle.

11. The wireless communications apparatus of claim 10, wherein system information modification indicators are provided at respective paging occasions comprising a set of paging occasions comprising a predetermined number of paging occasions located at respective predetermined positions within a modification period.

12. The wireless communications apparatus of claim 11, wherein the set of paging occasions comprises substantially all paging occasions in the modification period.

13. The wireless communications apparatus of claim 11, wherein the threshold amount of system information modification indicators is less than or equal to the number of paging occasions in the set of paging occasions.

14. The wireless communications apparatus of claim 11, wherein the threshold amount of system information modification indicators is substantially equal to a number of paging occasions monitored within the modification period by the wireless communications apparatus under normal operating conditions.

15. The wireless communications apparatus of claim 11, wherein the processor is further configured to receive information from an associated network, the information comprising at least one of the value identifying the threshold amount of system information modification indicators, a size of a block of pages, the connected mode discontinuous reception cycle, or any combination thereof.

16. The wireless communications apparatus of claim 10, wherein the processor is further configured to schedule attempted detection of the threshold amount of system information modification indicators in a modification period at least in part by identifying paging occasions including respective system information modification indicators that coincide with discontinuous reception occasions provided in the connected mode discontinuous reception cycle.

17. The wireless communications apparatus of claim 16, wherein the processor is further configured to compare an amount of identified paging occasions to the threshold amount of system information modification indicators and to schedule attempted detection of one or more additional paging occasions including respective system information modification indicators upon determining that additional paging occasions are required to reach the threshold amount of system information modification indicators.

18. The wireless communications apparatus of claim 17, wherein the processor is further configured to monitor respective additional system information modification indicators over one or more periods of activity outside the discontinuous reception occasions provided in the discontinuous reception cycle.

19. The wireless communications apparatus of claim 17, wherein the processor is further configured to monitor respective additional system information modification indicators by extending one or more discontinuous reception occasions provided in the discontinuous reception cycle.

20. An apparatus operable in a wireless communication system, the apparatus comprising:
means for receiving a value identifying a minimum number of paging occasions configured for carrying respective change indications to be read in a modification period;
means for configuring a discontinuous reception cycle that specifies respective periods of activity and inactivity associated with a connected mode of the apparatus;
means for monitoring for one of more paging occasions during a modification period for the minimum number of paging occasions configured for carrying respective change indications, wherein receiver activity outside respective periods of activity specified by the discontinuous reception cycle is reduced below a total number of paging occasions outside respective periods of activity specified by the discontinuous reception cycle; and
means for determining that the change of system information was not received during the modification period upon completion of the monitoring the minimum number of paging occasions.

21. The apparatus of claim 20, wherein the minimum number of paging occasions to be read in a modification period is less than or equal to the number of paging occasions in a set of paging occasions, wherein the set of paging occasions comprising a predetermined number of paging occasions located at respective predetermined positions within a modification period.

22. The apparatus of claim 20, further comprising means for obtaining at least one parameter from an Evolved UMTS (Universal Mobile Telecommunications System) Terrestrial Radio Access Network (E-UTRAN) selected from the group consisting of the value identifying the minimum number of paging occasions to be read in a modification period, a size of a block of pages, and information relating to the discontinuous reception cycle.

23. The apparatus of claim 20, wherein the means for monitoring further comprises one or more of:
means for scheduling one or more periods of activity during respective periods of inactivity associated with the discontinuous reception cycle to facilitate reading respective additional paging occasions; or
means for extending one or more periods of activity associated with the discontinuous reception cycle to facilitate reading respective additional paging occasions.

24. A non-transitory computer-readable medium, comprising:
code for causing a computer to receive a value identifying a threshold amount of system information modification indicators configured to be provided during respective paging occasions associated with at least a portion of a modification period;
code for causing the computer to configure a connected mode discontinuous reception cycle comprising respective periods of activity and inactivity;
code for causing the computer to monitor for one or more paging occasions configured to provide system information modification indicators in a modification period such that sufficient paging occasions are monitored to facilitate detection of at least the threshold amount of system information modification indicators, wherein activity outside of the periods of activity specified by the discontinuous reception cycle is reduced below a total number of paging occasions outside the discontinuous reception cycle; and
code for causing the computer to determine that change of system information was not received during the modification period upon completion of the monitoring the sufficient paging occasions.

25. The non-transitory computer-readable medium of claim 24, wherein the computer-readable medium further comprises code for causing a computer to obtain at least one of the value identifying the threshold amount of system information modification indicators, a size of a block of paging occasions, or information relating to the connected mode discontinuous reception cycle from an associated network.

26. The non-transitory computer-readable medium of claim 24, wherein the code for causing a computer to monitor further comprises one or more of:
   code for causing the computer to schedule one or more periods of activity during respective periods of inactivity associated with the connected mode discontinuous reception cycle to facilitate monitoring at least one additional paging occasion; or
   code for causing the computer to extend one or more periods of activity associated with the connected mode discontinuous reception cycle to facilitate monitoring at least one additional paging occasion.

* * * * *